United States Patent
Takeuchi et al.

(10) Patent No.: US 12,231,197 B2
(45) Date of Patent: Feb. 18, 2025

(54) CONTROL DEVICE, WIRELESS COMMUNICATIONS SYSTEM, AND NON-TRANSITORY COMPUTER-READABLE MEDIUM

(71) Applicant: NEC Corporation, Tokyo (JP)

(72) Inventors: Toshiki Takeuchi, Tokyo (JP); Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 2 days.

(21) Appl. No.: 18/132,633

(22) Filed: Apr. 10, 2023

(65) Prior Publication Data

US 2023/0344478 A1    Oct. 26, 2023

(30) Foreign Application Priority Data

Apr. 21, 2022 (JP) ................ 2022-069880

(51) Int. Cl.
*H04L 1/02* (2006.01)
*H04B 7/06* (2006.01)
*H04L 41/16* (2022.01)

(52) U.S. Cl.
CPC ......... *H04B 7/0608* (2013.01); *H04B 7/0695* (2013.01); *H04L 41/16* (2013.01)

(58) Field of Classification Search
CPC .... H04B 7/0608; H04B 7/0695; H04B 7/024; H04B 7/06952; H04B 7/0617;
(Continued)

(56) References Cited

U.S. PATENT DOCUMENTS

2011/0090980 A1\* 4/2011 Okino ................ H04B 17/373
                                                                 375/267
2016/0047884 A1    2/2016 Zhang et al.
(Continued)

FOREIGN PATENT DOCUMENTS

JP    2012-204955 A    10/2012
JP    2014-182554 A    9/2014
(Continued)

OTHER PUBLICATIONS

T. Nishio, et al., "Proactive Received Power Prediction Using Machine Learning and Depth Images for mmWave Networks," IEEE Journal on Selected Areas in Commun. No. 37(11), pp. 2413-2427, Nov. 2019.

*Primary Examiner* — Khai Tran
(74) *Attorney, Agent, or Firm* — Sughrue Mion, PLLC

(57) ABSTRACT

A control device configured to predict prediction information based on in-operation time-series data with use of a learning device, the learning device being trained, during training, (i) with time-series data, using as training data, in which pieces of radio quality information of respective antennas that are disposed in a distributed manner and that perform wireless communications with a terminal device are arranged in time series, and (ii) with assignment information, using as training data, that includes information about the antenna assigned, from the training data, to the wireless communications after a predetermined length of time, wherein the in-operation time-series data being the time-series data acquired during operation, and the prediction information including information about the antenna to be assigned, from the in-operation time-series data, to the wireless communications after the predetermined length of time.

18 Claims, 24 Drawing Sheets

(58) Field of Classification Search
CPC .... H04B 17/373; H04B 7/0413; H04B 41/16; H04L 41/16; H04L 41/147; H04W 92/045; H04W 48/10; G06N 3/08; G06N 20/00
USPC ........................................ 375/267, 260, 262
See application file for complete search history.

(56) References Cited

U.S. PATENT DOCUMENTS

| | | |
|---|---|---|
| 2019/0364492 A1 | 11/2019 | Azizi et al. |
| 2020/0037304 A1 | 1/2020 | Khojastepour et al. |
| 2020/0259545 A1* | 8/2020 | Bai ...................... H04B 7/0626 |
| 2021/0092584 A1* | 3/2021 | Zou ...................... H04W 4/029 |
| 2024/0031046 A1* | 1/2024 | Raghavan ............ H04B 17/345 |
| 2024/0089769 A1* | 3/2024 | Marzban ............... H04W 24/10 |

FOREIGN PATENT DOCUMENTS

| | | |
|---|---|---|
| JP | 2017-532811 A | 11/2017 |
| JP | 2020-507233 A | 3/2020 |
| JP | 2021-528010 A | 10/2021 |

* cited by examiner

CONTROL DEVICE, WIRELESS COMMUNICATIONS SYSTEM, AND NON-TRANSITORY COMPUTER-READABLE MEDIUM

INCORPORATION BY REFERENCE

This application is based upon and claims the benefit of priority from Japanese patent application No. 2022-069880, filed on Apr. 21, 2022, the disclosure of which is incorporated herein in its entirety by reference.

TECHNICAL FIELD

The present disclosure relates to a control device, a wireless communications system, a control method, a control program, and a storage medium having the control program stored therein and relates, for example, to a method of controlling antennas in a base station of a distributed antenna system (including distributed MIMO, etc.) and, in particular, to a method of predicting an antenna in a high-frequency band (millimeter waves or higher) for Beyond 5G, 6G, and so on.

BACKGROUND ART

To achieve communications in high-frequency bands, techniques have been proposed that estimate and predict the position of a terminal device based on a signal analysis (e.g., Published Japanese Translation of PCT International Publication for Patent Application, No. 2021-528010), a physical map (e.g., Published Japanese Translation of PCT International Publication for Patent Application, No. 2017-532811), or a camera image (e.g., Japanese Unexamined Patent Application Publication No. 2012-204955), and direct a directional beam to that position.

Furthermore, with regard to obstructions that impede communications, a technique has been proposed that estimates such an obstruction based on radio wave information corresponding to the position of a terminal device (e.g., Published Japanese Translation of PCT International Publication for Patent Application, No. 2020-507233), or techniques have been proposed that predict the quality of communications by dynamically detecting an object with, for example, a camera (e.g., T. Nishio, et al., "Proactive Received Power Prediction Using Machine Learning and Depth Images for mmWave Networks," IEEE Journal on Selected Areas in Commun. no. 37(11), pp. 2413-2427, November 2019.) or a radar (e.g., Japanese Unexamined Patent Application Publication No. 2014-182554).

In communications in high-frequency bands, radio-wave beams travel with high straightness, and an obstruction may divert a beam traveling to or from a terminal device. If a beam is diverted during communications, reconnecting the communications takes time. Therefore, it is desired to select an appropriate antenna and an appropriate beam by predicting a movement of a terminal device and an obstruction to the terminal device.

However, predicting both a movement of a terminal device and an obstruction to the terminal device is difficult with a signal analysis alone. Furthermore, it is difficult to control a beam by recognizing a dynamic obstruction based on radio wave information (e.g., a radio wave map) corresponding to the position of a terminal device. A camera, a radar, or the like may be difficult to install depending on the environment or may not be applicable or provide a sufficient performance due to the viewing angle or the like.

The present disclosure has been made to address such shortcomings and is directed to providing a control device, a wireless communications system, a control method, and a control program capable of predicting a movement of a terminal device and an obstruction to the terminal device to improve the quality of communications.

SUMMARY

A control device according to one example embodiment configured to predict prediction information based on in-operation time-series data by use of a learning device, the learning device being trained, during training, (i) with time-series data, using as training data, in which pieces of radio quality information of respective antennas that are disposed in a distributed manner and that perform wireless communications with a terminal device are arranged in time series, and (ii) with assignment information, using as a training label, that includes information about the antenna assigned, from the training data, to the wireless communications after a predetermined length of time, wherein the in-operation time-series data being the time-series data acquired during operation, and the prediction information including information about the antenna to be assigned, from the in-operation time-series data, to the wireless communications after the predetermined length of time.

A wireless communications system according to one example embodiment includes a plurality of antennas disposed in a distributed manner and configured to perform wireless communications with a terminal device; and a control device configured to predict prediction information based on in-operation time-series data by use of a learning device, the learning device being trained, during training, (i) with time-series data, using as training data, in which pieces of radio quality information of the respective antennas are arranged in time series, and (ii) with assignment information, using as a training label, that includes information about the antenna assigned, from the training data, to the wireless communications after a predetermined length of time, wherein the in-operation time-series data being the time-series data acquired during operation, and the prediction information including information about the antenna to be assigned, from the in-operation time-series data, to the wireless communications after the predetermined length of time.

A control method according to one example embodiment includes predicting prediction information based on in-operation time-series data by use of a learning device, the learning device being trained, during training, (i) with time-series data, using as training data, in which pieces of radio quality information of respective antennas that are disposed in a distributed manner and that perform wireless communications with a terminal device are arranged in time series, and (ii) with assignment information, using as a training label, that includes information about the antenna assigned, from the training data, to the wireless communications after a predetermined length of time, wherein the in-operation time-series data being the time-series data acquired during operation, and the prediction information including information about the antenna to be assigned, from the in-operation time-series data, to the wireless communications after the predetermined length of time.

A control program according to one example embodiment or a storage medium storing the control program causes a computer to execute predicting prediction information based on in-operation time-series data by use of a learning device, the learning device being trained, during training, (i) with time-series data, using as training data, in which pieces of radio quality information of respective antennas that are disposed in a distributed manner and that perform wireless communications with a terminal device are arranged in time series, and (ii) with assignment information, using as a training label, that includes information about the antenna assigned, from the training data, to the wireless communications after a predetermined length of time, wherein the in-operation time-series data being the time-series data acquired during operation, and the prediction information including information about the antenna to be assigned, from the in-operation time-series data, to the wireless communications after the predetermined length of time.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENTS

Figure 1:
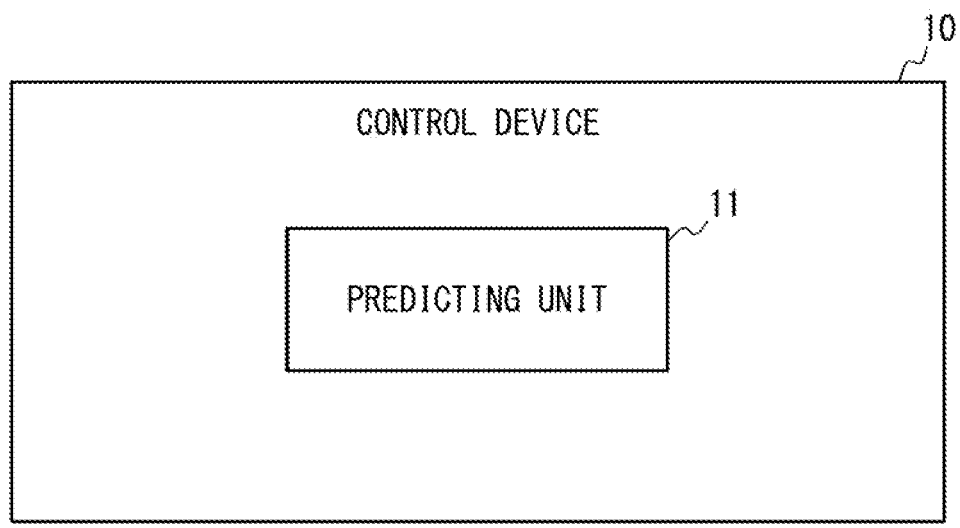
FIG. 1 is a block diagram illustrating an example of a control device according to an outline of an example embodiment.

Hereinafter, some example embodiments will be described with reference to the drawings. In the following description and drawings, omissions and simplifications are made, as appropriate, to make the description clearer. In the drawings, identical elements are given identical reference signs, and their repetitive description will be omitted, as necessary.

(Outline of Example Embodiment)

First, a control device (controller) according to an outline of an example embodiment will be described. FIG. 1 is a block diagram illustrating an example of a control device according to an outline of an example embodiment. As illustrated in FIG. 1, a control device 10 includes a predicting unit 11. The predicting unit 11 has a function of a predicting means. The predicting unit 11, with use of a learning device (learner), predicts information about an antenna to be assigned to wireless communications with a terminal device.

Specifically, with use of a learning device, the predicting unit 11 predicts information about an antenna to be assigned a predetermined length of time after in-operation time-series information, based on in-operation time-series data, which is time-series data acquired during operation. In this example, the learning device is trained, during training, with time-series data used as training data and with information about an antenna assigned to wireless communications a predetermined length of time after the training data used as a training label.

Herein, data in which radio quality information of each of a plurality of antennas disposed in a distributed manner is arranged in time series is referred to as time-series data. Meanwhile, information about an antenna assigned to wireless communications is referred to as assignment information. Furthermore, information that the predicting unit 11 predicts about an antenna to be assigned a predetermined length of time after time-series data is referred to as prediction information. Hence, assignment information includes information about an antenna assigned to wireless communications a predetermined length of time after training data. Prediction information includes information about an antenna to be assigned a predetermined length of time after in-operation time-series data. Meanwhile, assignment information and prediction information may include information about beams to be formed and input or output with use of a plurality of antenna elements of an antenna.

Figure 2:
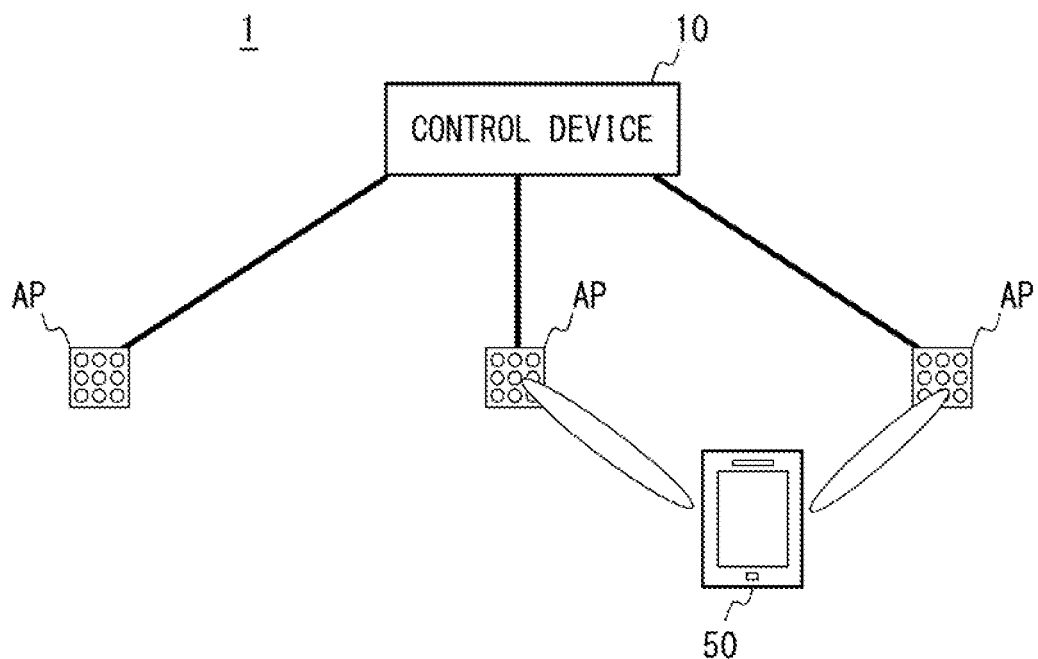
FIG. 2 is a configuration diagram illustrating an example of a wireless communications system according to an outline of an example embodiment.

FIG. 2 is a configuration diagram illustrating an example of a wireless communications system according to an outline of an example embodiment. As illustrated in FIG. 2, a wireless communications system 1 includes a plurality of antennas AP and the control device 10 described above. The plurality of antennas AP are connected to the control device 10 via wired or wireless communications circuits. A wired communications circuit may be, for example, a circuit that includes an optical fiber. The plurality of antennas AP wirelessly communicate with a terminal device 50.

The control device 10 may be provided in a wireless base station apparatus or in an apparatus other than a wireless base station apparatus. For example, a wireless base station apparatus may include part or the whole of the control device 10. For example, at least any one of a radio unit (RU), a distributed unit (DU), or a center unit (CU) of a wireless base station apparatus may include part or the whole of the control device 10.

As to an apparatus other than a wireless base station apparatus, an external device such as a RAN intelligent controller (RIC) that controls a wireless base station apparatus may include part or the whole of the control device 10. In this case, the wireless communications system 1 further includes a RIC apparatus that controls one or more wireless base station apparatuses. The control device 10 is provided in the RIC apparatus and acquires radio quality information from the wireless base station apparatuses. A relationship between the control device 10 and a wireless base station apparatus and a RIC apparatus will be described later.

Figure 3:
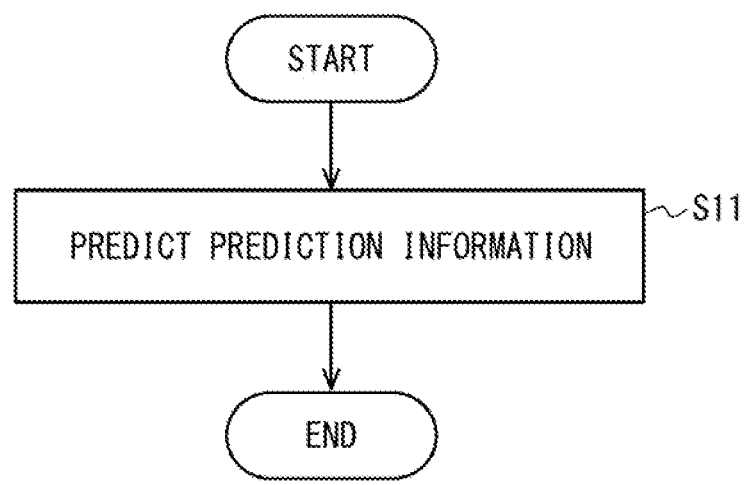
FIG. 3 is a flowchart illustrating an example of a wireless communications method according to an outline of an example embodiment.

Next, a control method will be described. FIG. 3 is a flowchart illustrating an example of a control method according to an outline of an example embodiment. As indicated by step S11 of FIG. 3, the control method includes a step of predicting prediction information. The step of predicting the prediction information includes predicting the prediction information with use of a learning device trained, during training, with time-series data used as training data and with assignment information assigned a predetermined length of time after the training data used as a training label.

Figure 4:
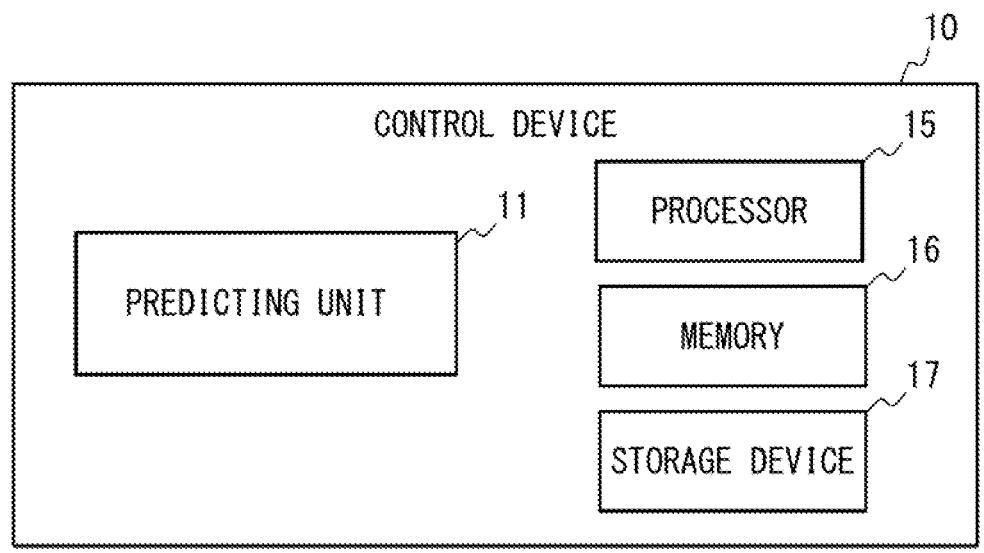
FIG. 4 is a block diagram illustrating an example of a control device 10 according to an outline of an example embodiment.

The control device 10 described above may be, for example, an information processing device, such as a microcomputer, a personal computer, or a server. FIG. 4 is a block diagram illustrating an example of a control device 10 according to an outline of an example embodiment. As illustrated in FIG. 4, the control device 10 may include a processor 15, a memory 16, and a storage device 17. The storage device 17 may store processes performed by the components of the control device 10 in the form of a program. The processor 15 may load the program from the storage device 17 onto the memory 16 and execute the program. With this configuration, the processor 15 implements the functions of the components, such as the predicting unit 11, of the control device 10.

The components of the control device 10 may be each implemented by a dedicated piece of hardware. Part or the whole of each constituent element may be implemented by, for example, general-purpose or dedicated circuitry, the processor 15, or a combination thereof. Such constituent elements may be formed by a single chip or by a plurality of chips connected via a bus. Part or the whole of each constituent element may be implemented by a combination of, for example, the aforementioned circuitry and a program. For the processor 15, a central processing unit (CPU), a graphics processing unit (GPU), a field-programmable gate array (FPGA), a quantum processor (quantum computer control chip), or the like can be used.

In a case in which part or the whole of each constituent element of the control device 10 is implemented by a plurality of information processing devices, circuitries, or the like, these information processing devices, circuitries, or the like may be disposed centrally or distributedly. For example, these information processing devices, circuitries, or the like may be implemented in a mode in which they are connected to each other via a communications network through, for example, a client server system or a cloud computing system. The function of the control device 10 may be provided in a Software as a Service (SaaS) format.

The control device 10 and the wireless communications system 1 according to the present example embodiment include the predicting unit 11 that predicts prediction information with use of a learning device trained on time-series data and assignment information during training. This configuration makes it possible to predict prediction information about an antenna to be assigned to wireless communications and to improve the quality of communications.

First Example Embodiment

Figure 5:
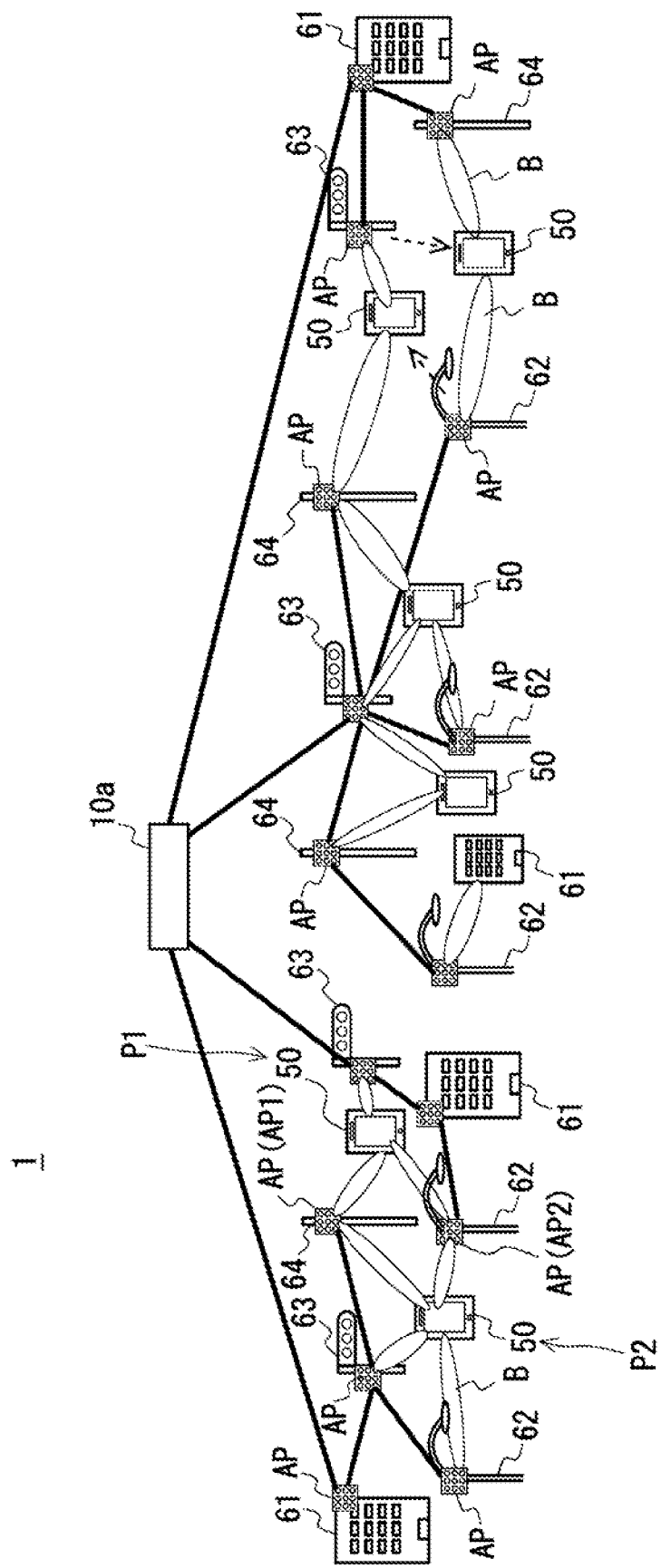
FIG. 5 illustrates an example of a wireless communications system according to a first example embodiment.

Next, a control device 10 and a wireless communications system according to a first example embodiment will be described. FIG. 5 illustrates an example of a wireless communications system 1 according to the first example embodiment. As illustrated in FIG. 5, the wireless communications system 1 includes, for example, a wireless base station apparatus 10a and a plurality of antennas AP. According to the present example embodiment, the wireless base station apparatus 10a may include the control device 10 (the predicting unit 11) described above. The wireless communications system 1 controls beams B that are input to or output from the plurality of distributedly disposed antennas AP of a distributed antenna system. The distributed antenna system is also referred to as distributed multiple-input multiple-output (MIMO). In FIG. 5, some reference signs are omitted to keep the drawing less complex.

The wireless communications system 1 controls, for example, antennas AP and beams B in a high-frequency band (millimeter waves or higher) for Beyond 5G, 6G, and so on. Note that the frequency band in which the wireless communications system 1 performs control is not limited to those for Beyond 5G and 6G.

The plurality of antennas AP are disposed in a distributed manner within a region that includes a path that the terminal device 50 moves along. Each antenna AP is connected to the wireless base station apparatus 10a via at least one of a wired communications circuit or a wireless communications circuit. The terminal device 50 is, for example, a portable terminal device, such as a smartphone, a tablet, or a laptop computer. The terminal device 50 may also be a wearable device equipped with a communications function; an information terminal, such as AR/VR glasses; a game console; a camera; an automobile; an automated guided vehicle (AGV); or an industrial device, such as a robot. Each antenna AP is disposed in an installed object, such as a building 61, a streetlight 62, a traffic signal 63, or a utility pole 64, provided within a region that includes a path that the terminal device 50 moves along.

The terminal device 50 moves while wirelessly communicating via antennas AP in the wireless communications system 1. As the terminal device 50 moves, the antenna AP that wirelessly communicates with the terminal device 50 changes. For example, when the terminal device 50 moves from a position P1 to a position P2, the antenna AP that wirelessly communicates with the terminal device 50 changes from an antenna AP1 to an antenna AP2. In the present specification, the reference sign AP is used to refer to the antennas AP collectively, and the reference sign AP1, AP2, or the like is used to refer to a specific antenna AP.

Figure 6:
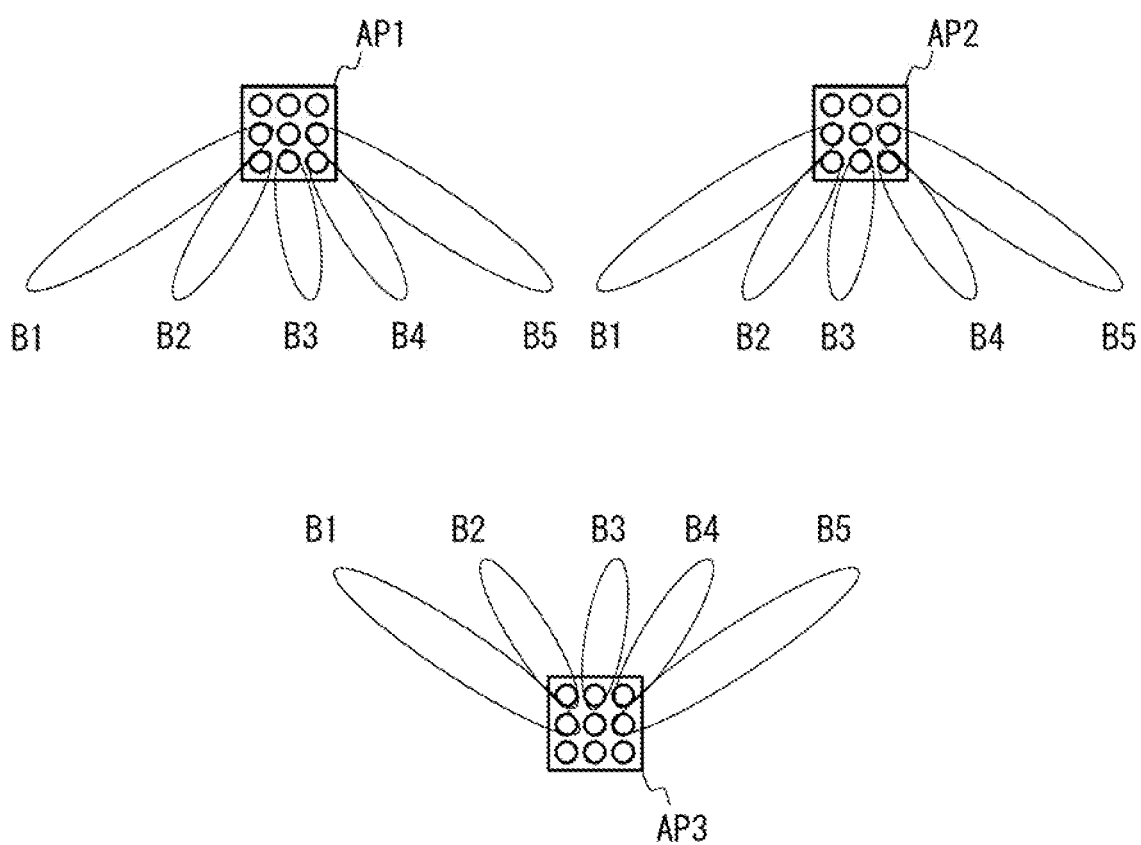
FIG. 6 illustrates an example of a plurality of beams that are input to or output from each antenna in the wireless communications system according to the first example embodiment.

FIG. 6 illustrates an example of a plurality of beams B that are input to or output from each antenna AP in the wireless communications system 1 according to the first example embodiment. As illustrated in FIG. 6, an antenna AP1 receives input of or outputs beams B1 to B5. An antenna AP2 receives input of or outputs beams B1 to B5. An antenna AP3 receives input of or outputs beams B1 to B5. The beams B1 to B5 represent radio waves that are input or output according to respective, different beam control settings with use of a plurality of antenna elements. Hence, the antennas AP1 to AP3 receive input of or output the beams B1 to B5 via the respective antenna elements.

Figure 7:
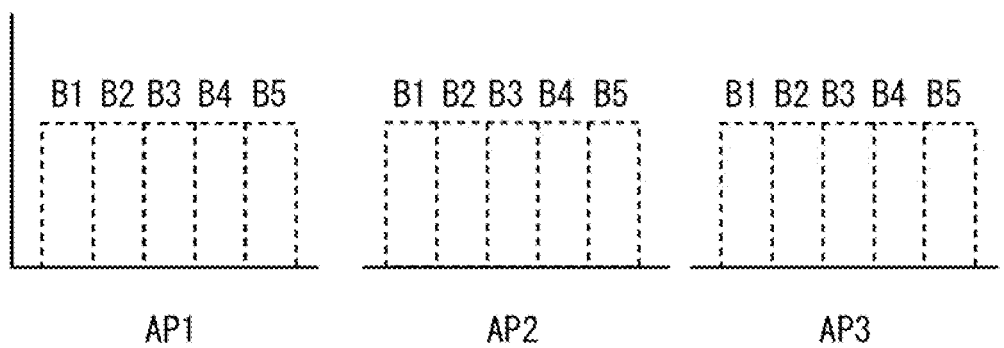
FIG. 7 illustrates an example of radio quality information of each antenna in the wireless communications system according to the first example embodiment.

FIG. 7 illustrates an example of radio quality information of each antenna in the wireless communications system 1 according to the first example embodiment. As illustrated in FIG. 7, the radio quality information of each of the beams B1 to B5 in the antennas AP1 to AP3 may be shown with a bar graph. For each of the antennas AP1 to AP3, the horizontal axis represents the beams B1 to B5, and the vertical axis represents the radio quality information. The radio quality information may be shown with use of a value such as a reference signal received power (RSRP) value of each of the beams B1 to B5.

Herein, the radio quality information is not limited to the RSRP value. For example, the radio quality information may include at least any one of signal power information, such as RSRP or a received signal strength indicator (RSSI), or channel estimation information, such as each frequency or each resource block (RB). The radio quality information may be, for example but not limited to, a signal-to-interference-plus-noise ratio (SINR) or channel state information (CSI).

The radio quality information may be a value obtained by channel-estimating, in the control device 10, an uplink signal including a sounding reference signal (SRS) from the terminal device 50. The radio quality information may be a value obtained as the control device 10 acquires information measuring, in the terminal device 50, a downlink signal including a synchronization signal block (SSB) or a channel state information reference signal (CSI-RS).

In a case in which the radio quality information is expressed by a value, any value no greater than a certain threshold may be replaced by zero or by a lower limit value. The radio quality information of each of the beams B1 to B5 also serves as the radio quality information of each channel.

Figure 8:
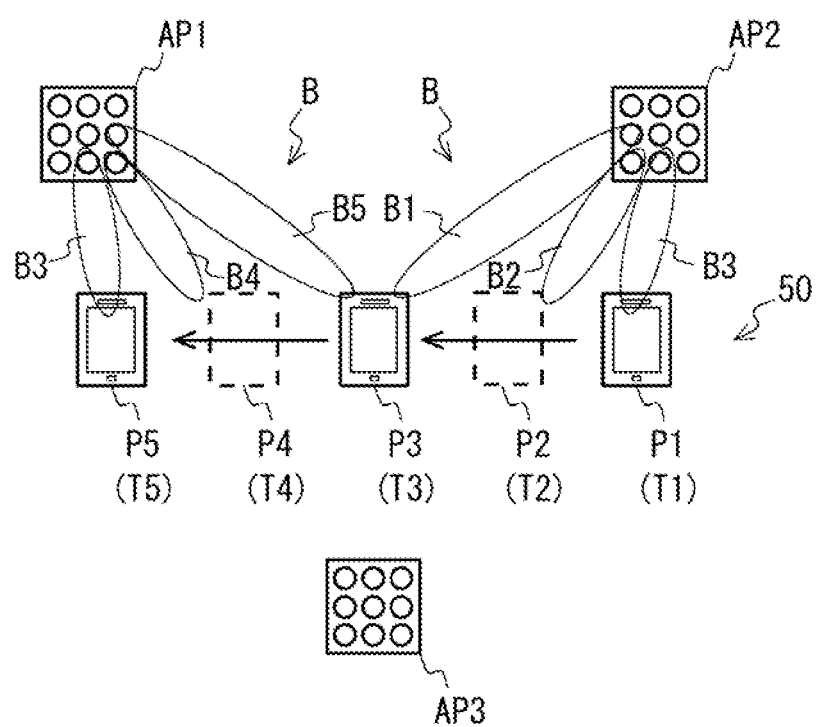
FIG. 8 illustrates an example of a plurality of beams that are input to or output from each antenna in the wireless communications system according to the first example embodiment.

FIG. 8 illustrates an example of a plurality of beams B1 to B5 that are input to or output from each of the antennas AP1 to AP3 in the wireless communications system 1 according to the first example embodiment. As illustrated in FIG. 8, the terminal device 50 moves from a position P1 to a position P5 during a period from a time T1 to a time T5. In this case, the terminal device 50 switches the beams B to use for wireless communications from the beams B of the antenna AP2 to the beams B of the antenna AP1. The term "beam(s) B" is used to refer to the beams collectively, and a specific reference sign is added, as in a beam B1 or the like, to refer to a specific beam B. Each beam B may be input to or output from an antenna AP.

Specifically, at the time T1, the terminal device 50 is located at the position P1 and wirelessly communicates with use of the beam B3 of the antenna AP2. At the time T2, the terminal device 50 is located at the position P2 and wirelessly communicates with use of the beam B2 of the antenna AP2. At the time T3, the terminal device 50 is located at the position P3 and wirelessly communicates with use of the beam B5 of the antenna AP1. At the time T4, the terminal device 50 is located at the position P4 and wirelessly communicates with use of the beam B4 of the antenna AP1. At the time T5, the terminal device 50 is located at the position P5 and wirelessly communicates with use of the beam B3 of the antenna AP1.

Figure 9:
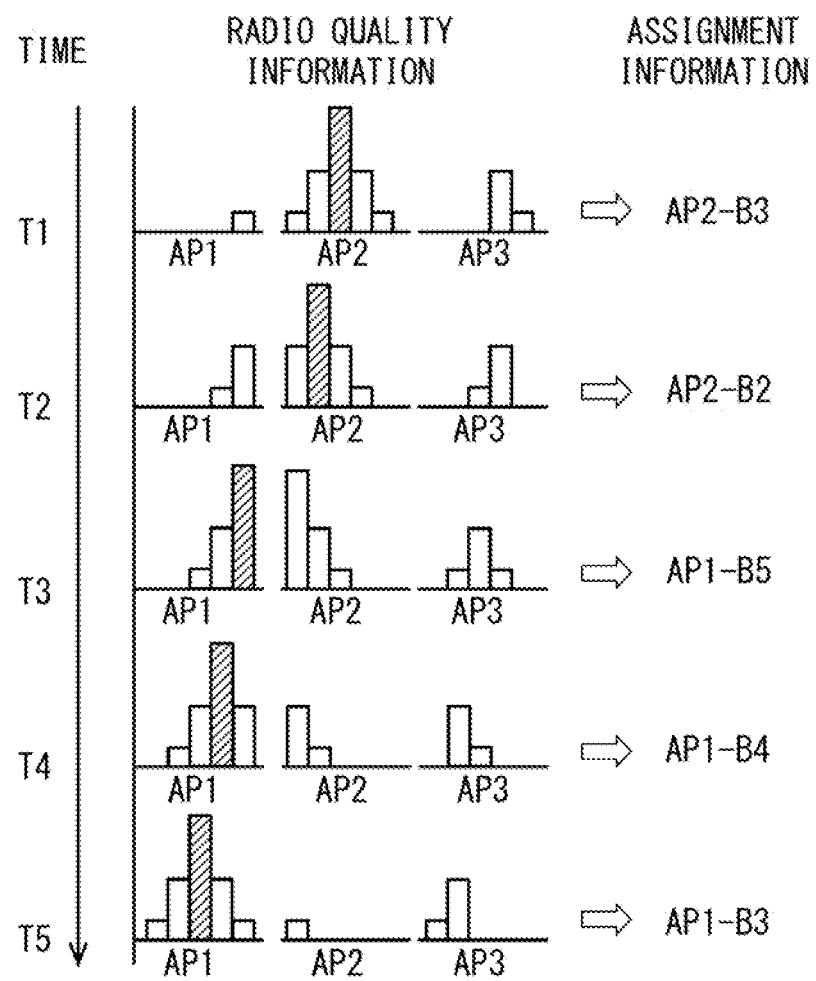
FIG. 9 illustrates an example of radio quality information of each antenna and assignment information that includes information about antennas assigned to wireless communications in the wireless communications system according to the first example embodiment.

FIG. 9 illustrates an example of radio quality information of each of the antennas AP1 to AP3 and assignment information that includes information about antennas AP assigned to the wireless communications in the wireless communications system 1 according to the first example embodiment. As illustrated in FIG. 9, at the time T1, the radio quality information of the beams B1, B2, B3, B4, and B5 of the antenna AP1 indicates 0, 0, 0, 0, and low level, respectively. At the time T1, the radio quality information of the beams B1, B2, B3, B4, and B5 of the antenna AP2 indicates low level, mid level, high level, mid level, and low level, respectively. At the time T1, the radio quality information of the beams B1, B2, B3, B4, and B5 of the antenna AP3 indicates 0, 0, 0, mid level, and low level, respectively. Therefore, the antenna AP2 is assigned to the wireless communications at the time T1, based on the radio quality information. Specifically, the beam B3 of the antenna AP2 is assigned to the wireless communications as the beam B of the best (highest) radio quality, based on the radio quality information. The assignment information includes the antenna AP2 and the beam B3 of the antenna AP2.

At the time T2, the radio quality information of the beams B1, B2, B3, B4, and B5 of the antenna AP1 indicates 0, 0, 0, low level, and mid level, respectively. At the time T2, the radio quality information of the beams B1, B2, B3, B4, and B5 of the antenna AP2 indicates mid level, high level, mid level, low level, and 0, respectively. At the time T2, the radio quality information of the beams B1, B2, B3, B4, and B5 of the antenna AP3 indicates 0, 0, low level, mid level, and 0, respectively. Therefore, the antenna AP2 is assigned to the wireless communications at the time T2, based on the radio quality information. Specifically, the beam B2 of the antenna AP2 is assigned to the wireless communications as the beam B of the best (highest) radio quality, based on the radio quality information. The assignment information includes the antenna AP2 and the beam B2 of the antenna AP2.

At the time T3, the radio quality information of the beams B1, B2, B3, B4, and B5 of the antenna AP1 indicates 0, 0, low level, mid level, and high level, respectively. At the time T3, the radio quality information of the beams B1, B2, B3, B4, and B5 of the antenna AP2 indicates high level, mid level, low level, 0, and 0, respectively. At the time T3, the radio quality information of the beams B1, B2, B3, B4, and B5 of the antenna AP3 indicates 0, low level, mid level, low level, and 0, respectively. The beam B5 of the antenna AP1 and the beam B1 of the antenna AP2 are both at high level, but the level of the beam B5 of the antenna AP1 is somewhat higher. Therefore, the antenna AP1 is assigned to the wireless communications at the time T3, based on the radio quality information. Specifically, the beam B5 of the antenna AP1 is assigned to the wireless communications as the beam B of the best (highest) radio quality, based on the radio quality information. The assignment information includes the antenna AP1 and the beam B5 of the antenna AP1. In a case in which transmission and reception are permitted from a plurality of antennas AP, in addition to the beam B5 of the antenna AP1 of the best radio quality, the beam B1 of the antenna AP2 of the next best radio quality may also be assigned to the wireless communications.

At the time T4, the radio quality information of the beams B1, B2, B3, B4, and B5 of the antenna AP1 indicates 0, low level, mid level, high level, and mid level, respectively. At the time T4, the radio quality information of the beams B1, B2, B3, B4, and B5 of the antenna AP2 indicates mid level, low level, 0, 0, and 0, respectively. At the time T4, the radio quality information of the beams B1, B2, B3, B4, and B5 of the antenna AP3 indicates 0, mid level, low level, 0, and 0, respectively. Therefore, the antenna AP1 is assigned to the wireless communications at the time T4, based on the radio quality information. Specifically, the beam B4 of the antenna AP1 is assigned to the wireless communications as the beam B of the best (highest) radio quality, based on the radio quality information. The assignment information includes the antenna AP1 and the beam B4 of the antenna AP1.

At the time T5, the radio quality information of the beams B1, B2, B3, B4, and B5 of the antenna AP1 indicates low level, mid level, high level, mid level, and low level, respectively. At the time T5, the radio quality information of the beams B1, B2, B3, B4, and B5 of the antenna AP2 indicates low level, 0, 0, 0, and 0, respectively. At the time T5, the radio quality information of the beams B1, B2, B3, B4, and B5 of the antenna AP3 indicates low level, mid level, 0, 0, and 0, respectively. Therefore, the antenna AP1 is assigned to the wireless communications at the time T5, based on the radio quality information. Specifically, the beam B3 of the antenna AP1 is assigned to the wireless communications as the beam B of the best (highest) radio quality, based on the radio quality information. The assignment information includes the antenna AP1 and the beam B3 of the antenna AP1.

In this manner, the antenna AP and the beam B of the best radio quality information, for example, are assigned to the wireless communications at each of the times T1 to T5, based on the radio quality information.

Figure 10:
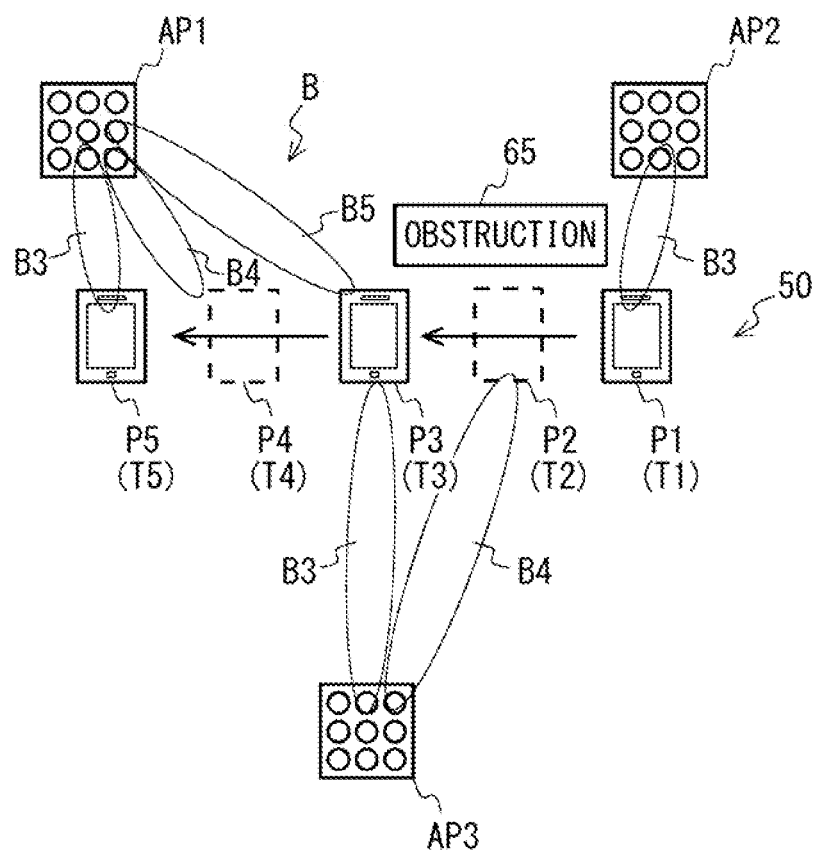
FIG. 10 illustrates an example of a plurality of beams that are input to or output from each antenna in the wireless communications system according to the first example embodiment.

FIG. 10 illustrates an example of a plurality of beams B1 to B5 that are input to or output from each of the antennas AP1 to AP3 in the wireless communications system 1 according to the first example embodiment. As illustrated in FIG. 10, the terminal device 50 moves from the position P1 to the position P5 during a period from the time T1 to the time T5. In the case illustrated in FIG. 10, a static obstruction 65 that blocks the beam B is located between the antenna AP2 and the positions P2 to P5 of the terminal device 50. Therefore, the terminal device 50 switches the beams B from the beams B of the antenna AP2 to the beams B of the antenna AP3 and to the beams B of the antenna AP1.

Specifically, at the time T1, the terminal device 50 is located at the position P1 and wirelessly communicates with use of the beam B3 of the antenna AP2. At the time T2, the terminal device 50 is located at the position P2 and wirelessly communicates with use of the beam B4 of the antenna AP3. At the time T3, the terminal device 50 is located at the position P3 and wirelessly communicates with use of the beam B3 of the antenna AP3. At the time T4, the terminal device 50 is located at the position P4 and wirelessly communicates with use of the beam B4 of the antenna AP1. At the time T5, the terminal device 50 is located at the position P5 and wirelessly communicates with use of the beam B3 of the antenna AP1.

Figure 11:
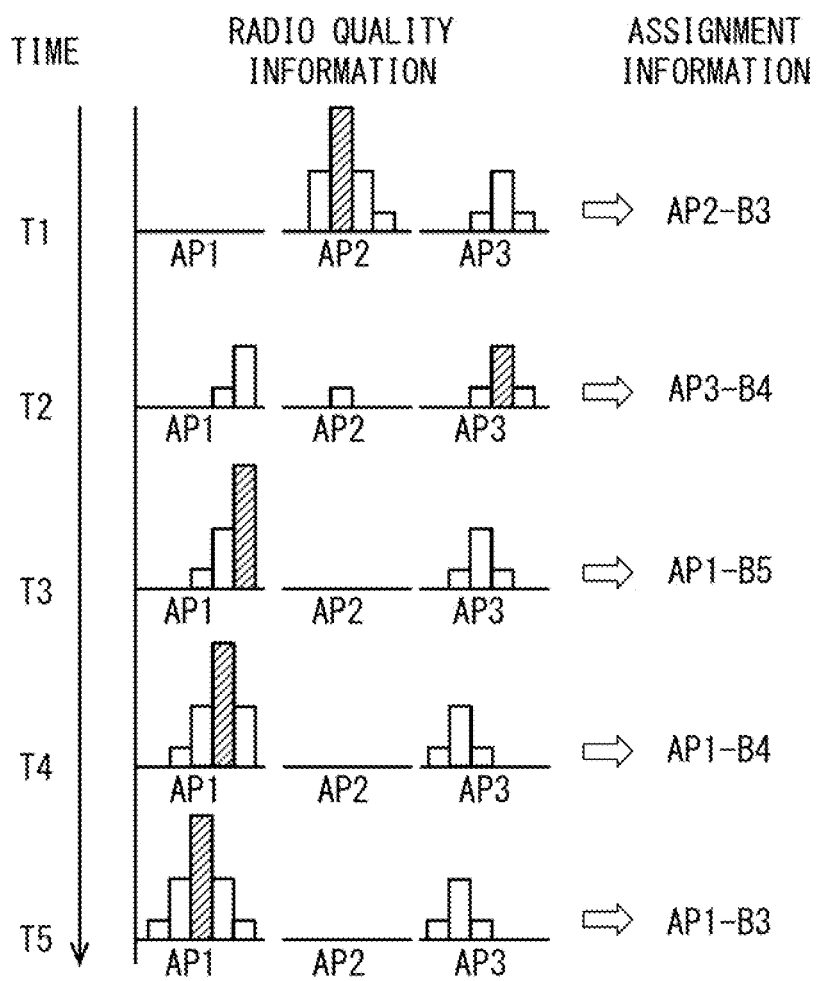
FIG. 11 illustrates an example of radio quality information of each antenna and assignment information that includes information about antennas assigned to wireless communications in the wireless communications system according to the first example embodiment.

FIG. 11 illustrates an example of radio quality information of each of the antennas AP1 to AP3 and assignment information that includes information about antennas AP assigned to the wireless communications in the wireless communications system 1 according to the first example embodiment. As illustrated in FIG. 11, at the time T1, the radio quality information of the beams B1, B2, B3, B4, and B5 of the antenna AP1 indicates 0, 0, 0, 0, and 0, respectively. At the time T1, the radio quality information of the beams B1, B2, B3, B4, and B5 of the antenna AP2 indicates 0, mid level, high level, mid level, and low level, respectively. At the time T1, the radio quality information of the beams B1, B2, B3, B4, and B5 of the antenna AP3 indicates 0, 0, low level, mid level, and low level, respectively. Therefore, the antenna AP2 is assigned to the wireless communications at the time T1, based on the radio quality information. Specifically, the beam B3 of the antenna AP2 is assigned to the wireless communications as the beam B of the best (highest) radio quality, based on the radio quality information. The assignment information includes the antenna AP2 and the beam B3 of the antenna AP2.

At the time T2, the radio quality information of the beams B1, B2, B3, B4, and B5 of the antenna AP1 indicates 0, 0, 0, low level, and mid level, respectively. At the time T2, the radio quality information of the beams B1, B2, B3, B4, and B5 of the antenna AP2 indicates 0, 0, low level, 0, and 0, respectively. At the time T2, the radio quality information of the beams B1, B2, B3, B4, and B5 of the antenna AP3 indicates 0, 0, low level, mid level, and low level, respectively. The beam B5 of the antenna AP1 and the beam B4 of the antenna AP3 are both at mid level, but the level of the beam B4 of the antenna AP3 is somewhat higher. Therefore, the antenna AP3 is assigned to the wireless communications at the time T2, based on the radio quality information. Specifically, the beam B4 of the antenna AP3 is assigned to the wireless communications as the beam B of the best (highest) radio quality, based on the radio quality information. The assignment information includes the antenna AP3 and the beam B4 of the antenna AP3. In a case in which transmission and reception are permitted from a plurality of antennas AP, in addition to the beam B4 of the antenna AP3 of the best radio quality, the beam B5 of the antenna AP1 of the next best radio quality may also be assigned to the wireless communications.

At the time T3, the radio quality information of the beams B1, B2, B3, B4, and B5 of the antenna AP1 indicates 0, 0, low level, mid level, and high level, respectively. At the time T3, the radio quality information of the beams B1, B2, B3, B4, and B5 of the antenna AP2 indicates 0, 0, 0, 0, and 0, respectively. At the time T3, the radio quality information of the beams B1, B2, B3, B4, and B5 of the antenna AP3 indicates 0, low level, mid level, low level, and 0, respectively. Therefore, the antenna AP1 is assigned to the wireless communications at the time T3, based on the radio quality information. Specifically, the beam B5 of the antenna AP1 is assigned to the wireless communications as the beam B of the best (highest) radio quality, based on the radio quality information. The assignment information includes the antenna AP1 and the beam B5 of the antenna AP1.

At the time T4, the radio quality information of the beams B1, B2, B3, B4, and B5 of the antenna AP1 indicates 0, low level, mid level, high level, and mid level, respectively. At the time T4, the radio quality information of the beams B1, B2, B3, B4, and B5 of the antenna AP2 indicates 0, 0, 0, 0, and 0, respectively. At the time T4, the radio quality information of the beams B1, B2, B3, B4, and B5 of the antenna AP3 indicates low level, mid level, low level, 0, and 0, respectively. Therefore, the antenna AP1 is assigned to the wireless communications at the time T4, based on the radio quality information. Specifically, the beam B4 of the antenna AP1 is assigned to the wireless communications as the beam B of the best (highest) radio quality, based on the radio quality information. The assignment information includes the antenna AP1 and the beam B4 of the antenna AP1.

At the time T5, the radio quality information of the beams B1, B2, B3, B4, and B5 of the antenna AP1 indicates low level, mid level, high level, mid level, and low level, respectively. At the time T5, the radio quality information of the beams B1, B2, B3, B4, and B5 of the antenna AP2 indicates 0, 0, 0, 0, and 0, respectively. At the time T5, the radio quality information of the beams B1, B2, B3, B4, and B5 of the antenna AP3 indicates low level, mid level, low level, 0, and 0, respectively. Therefore, the antenna AP1 is assigned to the wireless communications at the time T5, based on the radio quality information. Specifically, the beam B3 of the antenna AP1 is assigned to the wireless communications as the beam B of the best (highest) radio quality, based on the radio quality information. The assignment information includes the antenna AP1 and the beam B3 of the antenna AP1.

In this manner, the antenna AP and the beam B of the best radio quality information, for example, are assigned to the wireless communications at each time, based on the radio quality information. Because of the presence of the static obstruction 65 between the antenna AP2 and the positions P2 to P5, the antenna AP2 or the beams B1 to B5 of the antenna AP2 are not assigned to the wireless communications at the positions P2 to P5.

Figure 12:
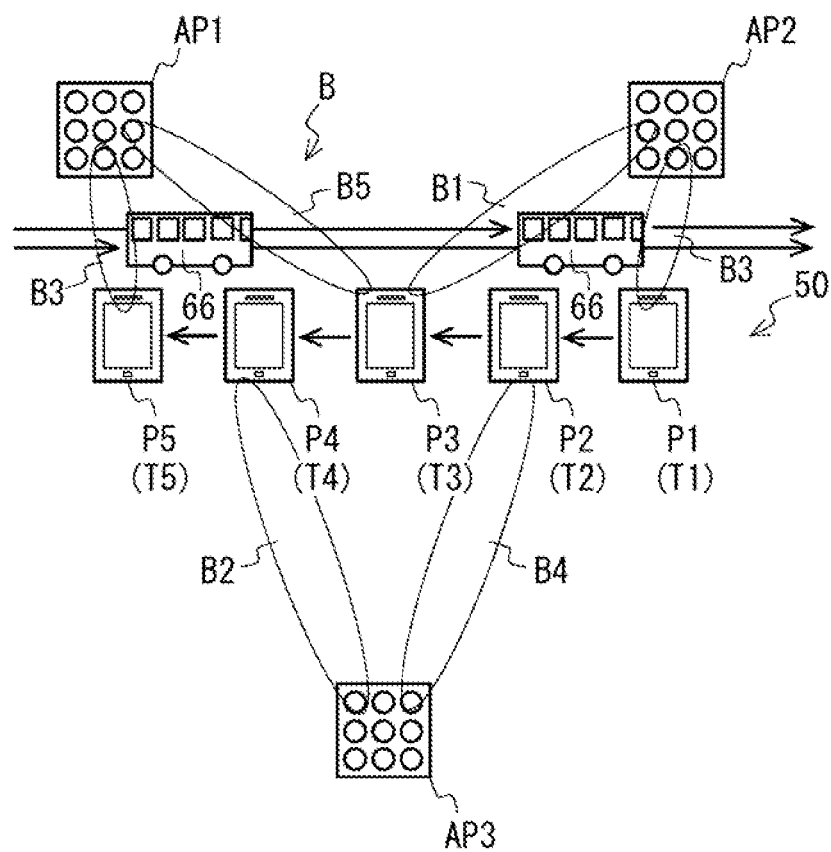
FIG. 12 illustrates an example of a plurality of beams that are input to or output from each antenna in the wireless communications system according to the first example embodiment.

FIG. 12 illustrates an example of a plurality of beams B1 to B5 that are input to or output from each of the antennas AP1 to AP3 in the wireless communications system 1 according to the first example embodiment. As illustrated in FIG. 12, the terminal device 50 moves from the position P1 to the position P5 during a period from the time T1 to the time T5. In the case illustrated in FIG. 12, dynamic obstructions 66 that block the beam B are located between the antenna AP2 and the position P2 of the terminal device 50 and between the antenna AP1 and the position P4 of the terminal device 50. Therefore, the terminal device 50 switches the beams B from the beams B of the antenna AP2 to the beams B of the antenna AP3 and to the beams B of the antenna AP1.

Specifically, at the time T1, the terminal device 50 is located at the position P1 and wirelessly communicates with use of the beam B3 of the antenna AP2. At the time T2, the terminal device 50 is located at the position P2 and wirelessly communicates with use of the beam B4 of the antenna AP3. At the time T3, the terminal device 50 is located at the position P3 and wirelessly communicates with use of the beam B5 of the antenna AP1. At the time T4, the terminal device 50 is located at the position P4 and wirelessly communicates with use of the beam B2 of the antenna AP3. At the time T5, the terminal device 50 is located at the position P5 and wirelessly communicates with use of the beam B3 of the antenna AP1.

Figure 13:
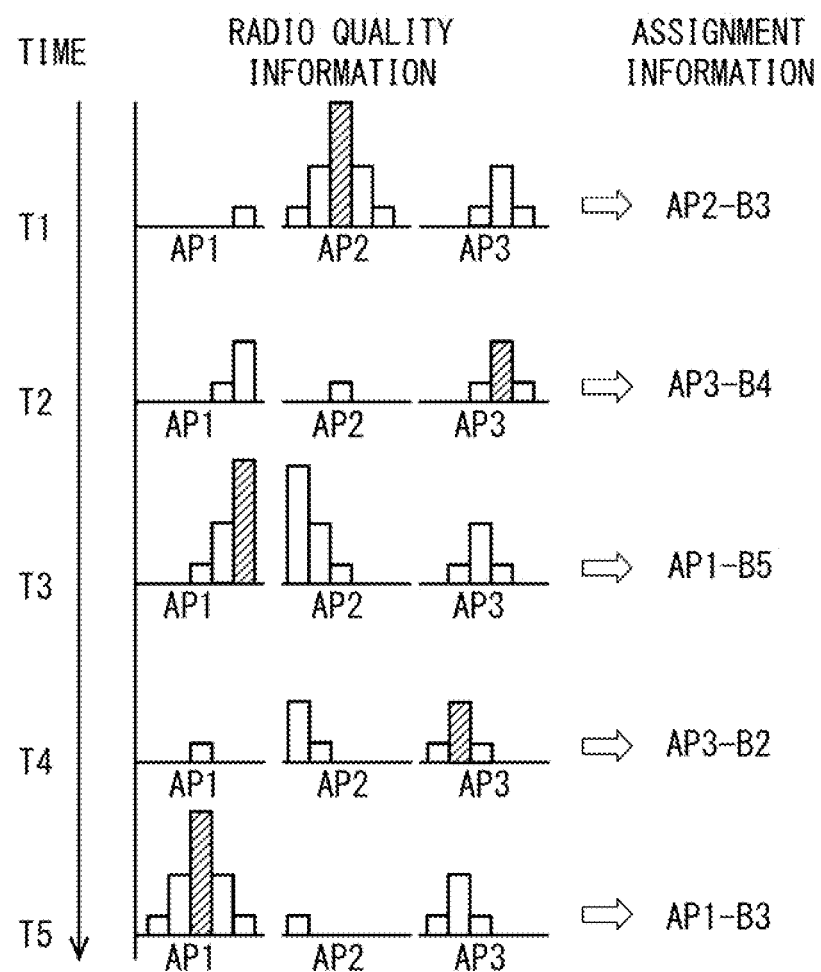
FIG. 13 illustrates an example of radio quality information of each antenna and assignment information that includes information about antennas assigned to wireless communications in the wireless communications system according to the first example embodiment.

FIG. 13 illustrates an example of radio quality information of each of the antennas AP1 to AP3 and assignment information that includes information about antennas assigned to the wireless communications in the wireless communications system 1 according to the first example embodiment. As illustrated in FIG. 13, at the time T1, the radio quality information of the beams B1, B2, B3, B4, and B5 of the antenna AP1 indicates 0, 0, 0, 0, and low level, respectively. At the time T1, the radio quality information of the beams B1, B2, B3, B4, and B5 of the antenna AP2 indicates low level, mid level, high level, mid level, and low level, respectively. At the time T1, the radio quality information of the beams B1, B2, B3, B4, and B5 of the antenna AP3 are 0, 0, low level, mid level, and low level, respectively. Therefore, the antenna AP2 is assigned to the wireless communications at the time T1, based on the radio quality information. Specifically, the beam B3 of the antenna AP2 is assigned to the wireless communications as the beam B of the best (highest) radio quality, based on the radio quality information. The assignment information includes the antenna AP2 and the beam B3 of the antenna AP2.

At the time T2, the radio quality information of the beams B1, B2, B3, B4, and B5 of the antenna AP1 indicates 0, 0, 0, low level, and mid level, respectively. At the time T2, the radio quality information of the beams B1, B2, B3, B4, and B5 of the antenna AP2 indicates 0, 0, low level, 0, and 0, respectively. At the time T2, the radio quality information of the beams B1, B2, B3, B4, and B5 of the antenna AP3 indicates 0, 0, low level, mid level, and low level, respectively. The beam B5 of the antenna AP1 and the beam B4 of the antenna AP3 are both at mid level, but the level of the beam B4 of the antenna AP3 is somewhat higher. Therefore, the antenna AP3 is assigned to the wireless communications at the time T2, based on the radio quality information. Specifically, the beam B4 of the antenna AP3 is assigned to the wireless communications as the beam B of the best (highest) radio quality, based on the radio quality information. The assignment information includes the antenna AP3 and the beam B4 of the antenna AP3. In a case in which transmission and reception are permitted from a plurality of antennas AP, in addition to the beam B4 of the antenna AP3 of the best radio quality, the beam B5 of the antenna AP1 of the next best radio quality may also be assigned to the wireless communications.

At the time T3, the radio quality information of the beams B1, B2, B3, B4, and B5 of the antenna AP1 indicates 0, 0, low level, mid level, and high level, respectively. At the time T3, the radio quality information of the beams B1, B2, B3, B4, and B5 of the antenna AP2 indicates high level, mid level, low level, 0, and 0, respectively. At the time T3, the radio quality information of the beams B1, B2, B3, B4, and B5 of the antenna AP3 indicates 0, low level, mid level, low level, and 0, respectively. The beam B5 of the antenna AP1 and the beam B1 of the antenna AP2 are both at high level, but the level of the beam B5 of the antenna AP1 is somewhat higher. Therefore, the antenna AP1 is assigned to the wireless communications at the time T3, based on the radio quality information. Specifically, the beam B5 of the antenna AP1 is assigned to the wireless communications as the beam B of the best (highest) radio quality, based on the radio quality information. The assignment information includes the antenna AP1 and the beam B5 of the antenna AP1.

At the time T4, the radio quality information of the beams B1, B2, B3, B4, and B5 of the antenna AP1 indicates 0, 0, low level, 0, and 0, respectively. At the time T4, the radio quality information of the beams B1, B2, B3, B4, and B5 of the antenna AP2 indicates mid level, low level, 0, 0, and 0, respectively. At the time T4, the radio quality information of the beams B1, B2, B3, B4, and B5 of the antenna AP3 indicates low level, mid level, low level, 0, and 0, respectively. The beam B1 of the antenna AP2 and the beam B2 of the antenna AP3 are both at mid level, but the level of the beam B2 of the antenna AP3 is somewhat higher. Therefore, the antenna AP3 is assigned to the wireless communications at the time T4, based on the radio quality information. Specifically, the beam B2 of the antenna AP3 is assigned to the wireless communications as the beam B of the best (highest) radio quality, based on the radio quality information. The assignment information includes the antenna AP3 and the beam B2 of the antenna AP3. In a case in which transmission and reception are permitted from a plurality of antennas AP, in addition to the beam B2 of the antenna AP3 of the best radio quality, the beam B1 of the antenna AP2 of the next best radio quality may also be assigned to the wireless communications.

At the time T5, the radio quality information of the beams B1, B2, B3, B4, and B5 of the antenna AP1 indicates low level, mid level, high level, mid level, and low level, respectively. At the time T5, the radio quality information of the beams B1, B2, B3, B4, and B5 of the antenna AP2 indicates low level, 0, 0, 0, and 0, respectively. At the time T5, the radio quality information of the beams B1, B2, B3, B4, and B5 of the antenna AP3 are low level, mid level, low level, 0, and 0, respectively. Therefore, the antenna AP1 is assigned to the wireless communications at the time T5, based on the radio quality information. Specifically, the beam B3 of the antenna AP1 is assigned to the wireless communications as the beam B of the best (highest) radio quality, based on the radio quality information. The assignment information includes the antenna AP1 and the beam B3 of the antenna AP1.

In this manner, the antenna AP and the beam B of the best radio quality information, for example, are assigned to the wireless communications at each time, based on the radio quality information. The dynamic obstructions 66 that block the beam B are disposed between the antenna AP2 and the position P2 of the terminal device 50 and between the antenna AP1 and the position P4 of the terminal device 50. Therefore, the antenna AP2 and the antenna AP1 are not assigned to the wireless communications at the time T2 and the time T4, respectively.

Figure 14:
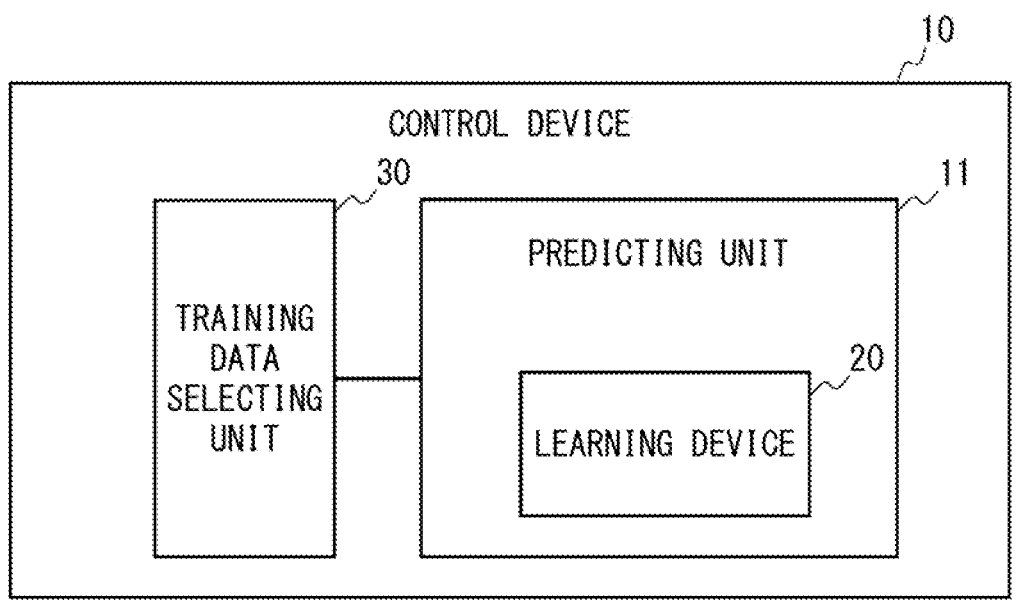
FIG. 14 is a block diagram illustrating an example of a control device according to the first example embodiment.

FIG. 14 is a block diagram illustrating an example of a control device 10 according to the first example embodiment. As illustrated in FIG. 14, the control device 10 may further include a learning device 20 and a training data selecting unit 30. The learning device 20 and the training data selecting unit 30 have functions of, respectively, a learning means and a training data selecting means.

The learning device 20 is trained with time-series data in which pieces of radio quality information of the respective antennas AP that wirelessly communicate with the terminal device 50 are arranged in time series used as training data. The learning device 20 may be trained with assignment information that includes information about an antenna AP assigned to the wireless communications a predetermined length of time after the training data used as a training label. The learning device 20 may be provided in the predicting unit 11. Herein, the learning device 20 may be provided outside the control device 10.

The training data selecting unit 30 selects training data for training the learning device 20. The training data selecting unit 30 is provided in the control device 10. Herein, the training data selecting unit 30 may be provided outside the control device 10.

Figure 15:
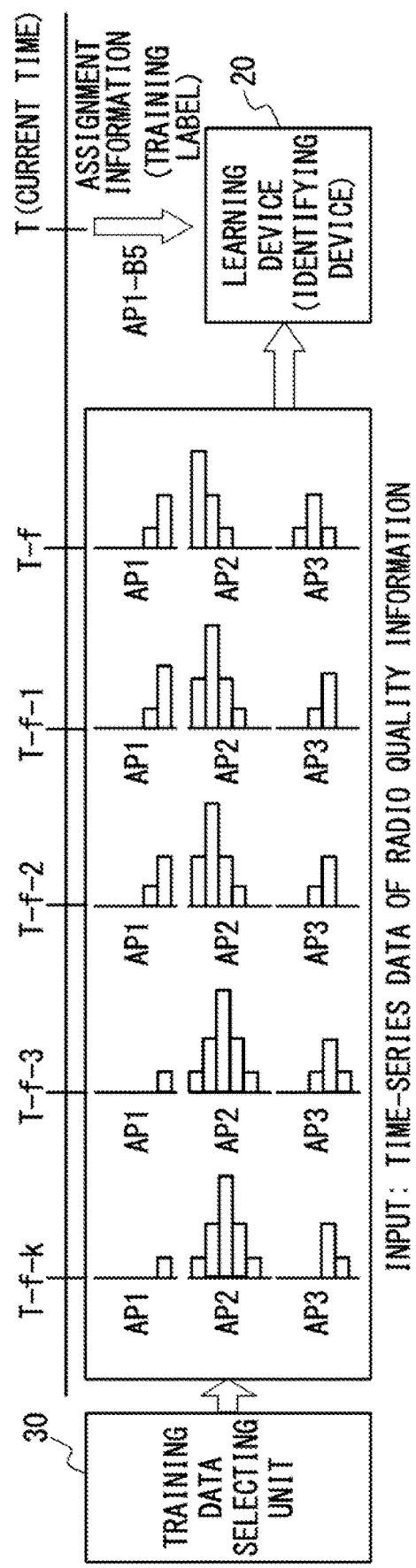
FIG. 15 schematically illustrates how a learning device is trained, during training, on input time-series data of radio quality information of each antenna in the control device according to the first example embodiment.

FIG. 15 schematically illustrates how the learning device 20 is trained, during training, on input time-series data of radio quality information of the antennas AP1 to AP3 in the control device 10 according to the first example embodiment. As illustrated in FIG. 15, the time-series data of the radio quality information of the antennas AP1 to AP3 input during training includes, for example, the radio quality information of the period going back from a time T–f to a time T–f–k, with the current time being a time T. In other words, the time-series data includes the radio quality information of the period from the time T–f–k to the time T–f.

The learning device 20 is trained with the input time-series data used as training data and with the assignment information that includes information about the antenna AP assigned to the wireless communications a predetermined length of time f after the time-series data used as a training label. The learning device 20 receives input of the training data and the training label from the training data selecting unit 30, which will be described later. Herein, the current time T is the time the length of time f after the time-series data.

The learning device 20 may include a convolutional neural network (CNN) and a long short term memory (LSTM). The learning device 20 may extract at least one of a local maximum or a local minimum or a temporal fluctuation with the CNN, may estimate a long-term change in the radio quality attributable to the position or the movement of the terminal device 50 with the LSTM (long), and may estimate a short-term change in the radio quality attributable to an obstruction 65 or 66 with the LSTM (short). Herein, a short-term change in the radio quality attributable to the obstruction 65 or 66 includes a deterioration (a decrease) in the radio quality caused by blockage of radio waves or a fluctuation in the radio quality caused by a multipass (phasing) or the like that occurs as radio waves are reflected by an obstruction.

Figure 16:
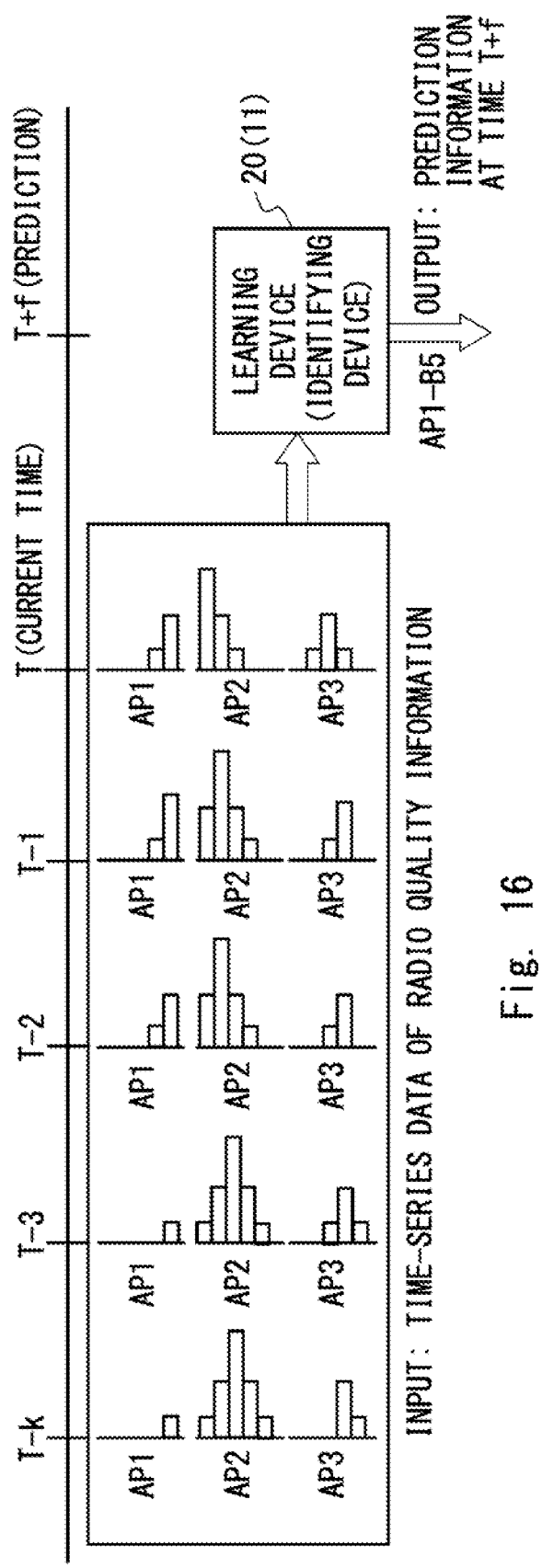
FIG. 16 schematically illustrates how the learning device operates, during operation, based on input time-series data of radio quality information of each antenna in the control device according to the first example embodiment.

FIG. 16 schematically illustrates how the learning device 20 operates, during operation, based on input time-series data of radio quality information of the antennas AP1 to AP3 in the control device 10 according to the first example embodiment. As illustrated in FIG. 16, during operation, the predicting unit 11 acquires input time-series data of the radio quality information of the antennas AP1 to AP3. The time-series data of the radio quality information used during operation is referred to as in-operation time-series data. The in-operation time-series data includes the radio quality information of the period going back from the current time T to a time T–k. In other words, the in-operation time-series data includes the radio quality information of the period from the time T-k to the time T. With use of the learning device 20 described above, the predicting unit 11 then predicts prediction information that includes information about the antenna AP to be assigned to the wireless communications a predetermined length of time f after the in-operation time-series data, based on the in-operation time-series data.

Figure 17:
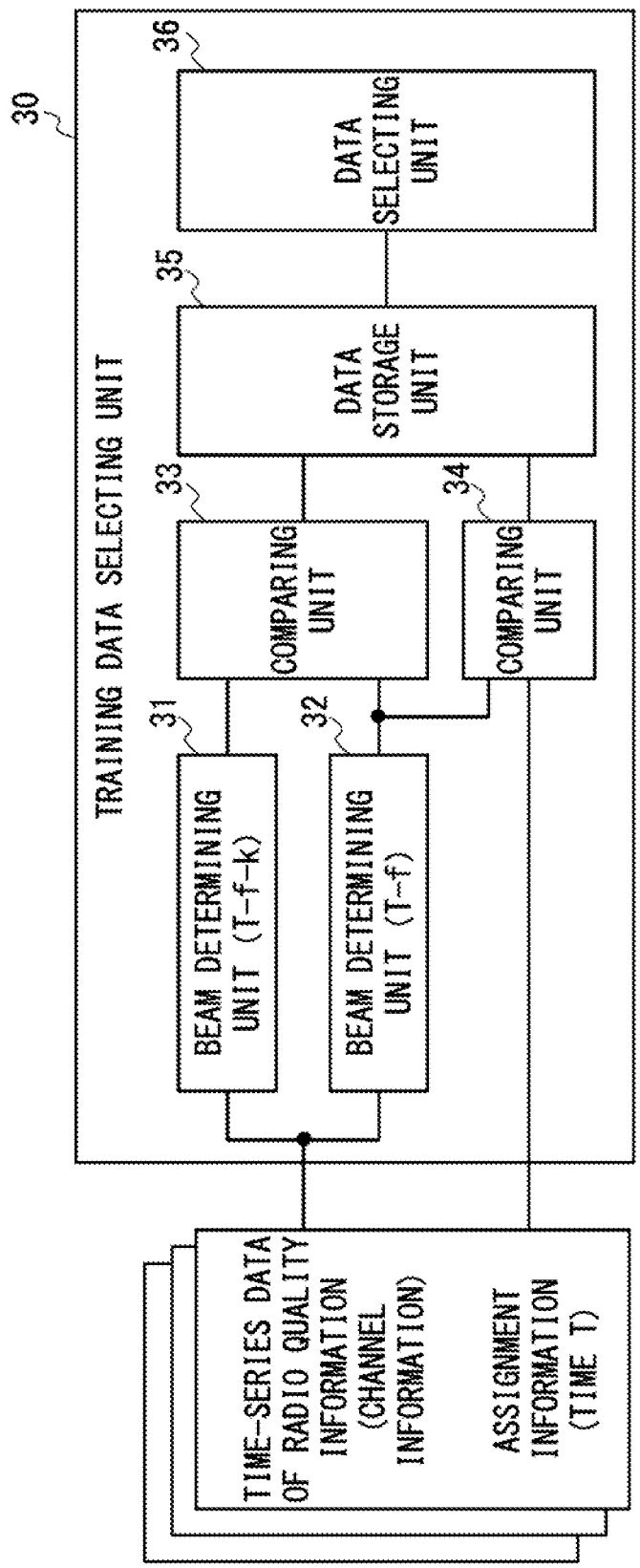
FIG. 17 is a block diagram illustrating an example of a training data selecting unit in the control device according to the first example embodiment.

FIG. 17 is a block diagram illustrating an example of the training data selecting unit 30 in the control device 10 according to the first example embodiment. As illustrated in FIG. 17, the control device 10 may further include the training data selecting unit 30. The training data selecting unit 30 includes a beam determining unit 31, a beam determining unit 32, a comparing unit 33, a comparing unit 34, a data storage unit 35, and a data selecting unit 36. The beam determining unit 31, the beam determining unit 32, the comparing unit 33, the comparing unit 34, the data storage unit 35, and the data selecting unit 36 have functions of, respectively, a beam determining means, another beam determining means, a comparing means, another comparing means, a data storage means, and a data selecting means. The training data selecting unit 30 receives input of time-series data of radio quality information and assignment information that includes information about an antenna assigned to the wireless communications at the time T. The assignment information includes the antenna AP and the beam B that are assigned to the wireless communications at the time T, based on the radio quality information.

The beam determining unit 31 determines the antenna AP and the beam B that are assigned to the wireless communications at each time, based on the radio quality information of each time in the period from the time (T−f−k) to the time (T−f−1). The beam determining unit 32 determines the antenna AP and the beam B that are assigned at the time (T−f), based on the radio quality information of the time (T−f). The comparing unit 33 compares the antenna AP and the beam B that are assigned at each time (e.g., T−f−m, where 1≤m<k) in the period from the time (T−f−k) to the time (T−f−1) with the antenna AP and the beam B that are assigned at the immediately preceding time (T−f−m−1). The comparing unit 34 compares the antenna AP and the beam B that are assigned at the time (T−f) with the antenna AP and the beam B that are assigned at the time T. The antenna AP and the beam B that are assigned at the time T correspond to the assignment information that serves as a training label.

The data storage unit 35 stores, into a first group, data in which the antenna AP and the beam B at the time (T−f) immediately preceding the training label are the same as the antenna AP and the beam B of the training label. The data storage unit 35 stores, into a second group, data in which, of the antenna AP and the beam B at the time (T−f)) immediately preceding the training label, the beam B is different from the beam B of the training label but the antenna AP is the same as the antenna AP of the training label. The data storage unit 35 stores, into a third group, data in which the antenna AP and the beam B at the time (T−f) immediately preceding the training label are different from, respectively, the antenna AP and the beam B of the training label.

The data selecting unit 36 selects, as training data, data from the first group, the second group, and the third group in a balanced manner. For example, in a case in which the first group has an overwhelmingly large amount of time-series data and the second group and the third group each have an overwhelmingly small amount of time-series data, the data selecting unit 36 selects training data such that the ratio of the data from the first group is small and the ratio of the data from the second group and the third group is large.

In this manner, during training, the training data selecting unit 30 selects, as training data, the time-series data classified (into the first group to the third group) in accordance with a result of the comparison of the assignment information serving as a training label and the assignment information assigned to the wireless communications based on the radio quality information immediately preceding the training label in the time-series data. The training data selecting unit 30 outputs the selected time-series data to the learning device 20.

The comparing unit 33 compares the antenna AP and the beam B that are assigned at a certain time (e.g., T−f−n, where 1≤n<k) in the period from the time (T−f−k) to the time (T−f−1) with the antenna AP and the beam B that are assigned at the immediately preceding time (T−f−n−1).

Then, the data storage unit 35 stores, into a fourth group, data in which the antenna AP and the beam B at the time (T−f−n) are the same as the antenna AP and the beam B at the time (T−f−n−1). The data storage unit 35 stores, into a fifth group, data in which, of the antenna AP and the beam B at the time (T−f−n), the beam B is different from the beam B at the time (T−f−n−1) but the antenna AP is the same as the antenna AP at the time (T−f−n−1). The data storage unit 35 stores, into a sixth group, data in which the antenna AP and the beam B at the time (T−f−n) are different from, respectively, the antenna AP and the beam B at the time (T−f−n−1).

The data selecting unit 36 selects, as training data, data from the fourth group, the fifth group, and the sixth group in a balanced manner. For example, in a case in which the fourth group has an overwhelmingly large amount of time-series data and the fifth group and the sixth group each have an overwhelmingly small amount of time-series data, the data selecting unit 36 selects training data such that the ratio of the data from the fourth group is small and the ratio of the data from the fifth group and the sixth group is large.

In this manner, the training data selecting unit 30 selects, as training data, the time-series data classified (into the fourth group to the sixth group) in accordance with a result of the comparison of pieces of assignment information assigned to the wireless communications based on the radio quality information in the time-series data. The training data selecting unit 30 outputs the selected time-series data to the learning device 20.

Figure 18:
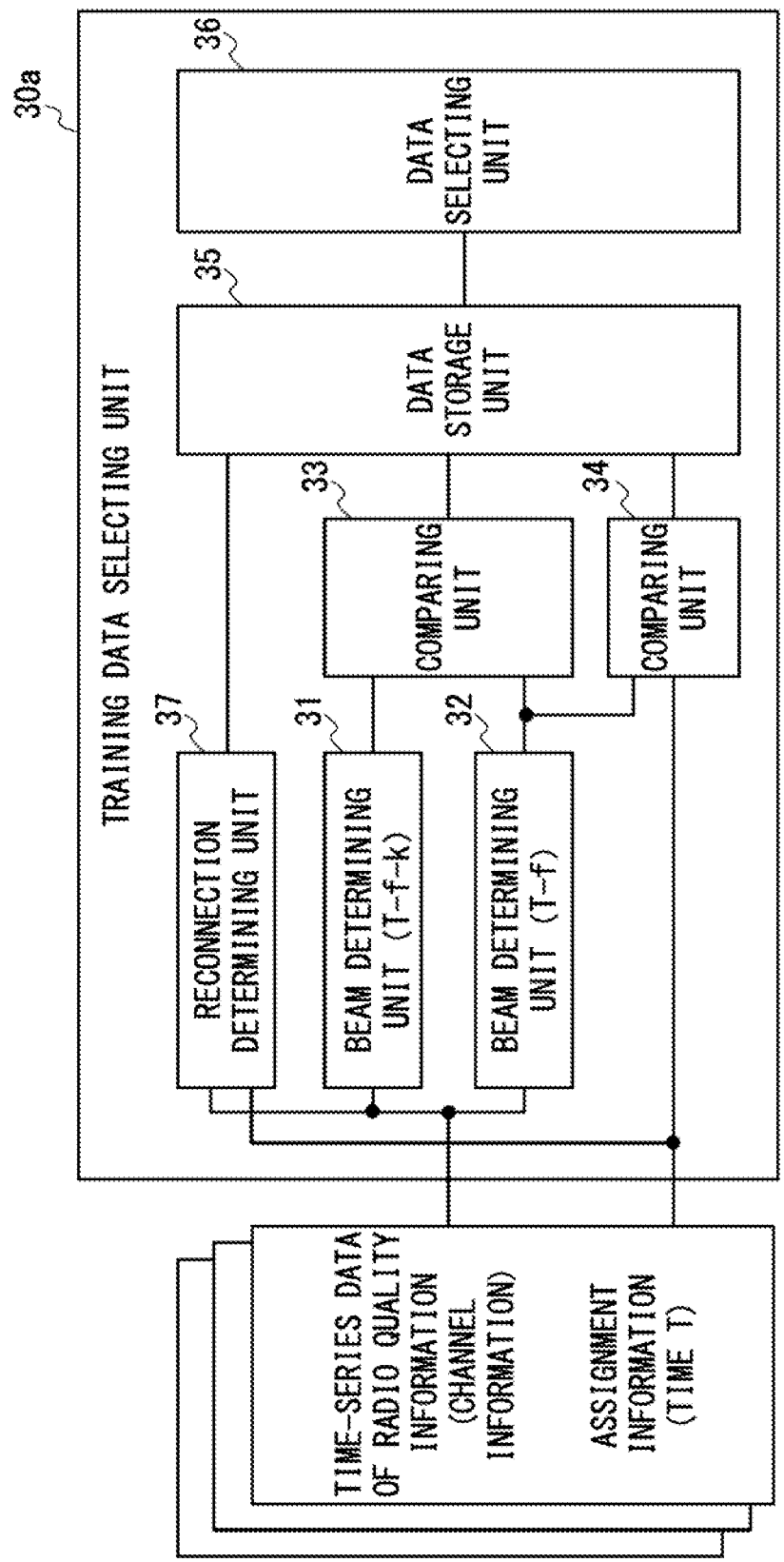
FIG. 18 is a block diagram illustrating an example of another training data selecting unit in the control device according to the first example embodiment.

FIG. 18 is a block diagram illustrating an example of another training data selecting unit in a control device according to the first example embodiment. As illustrated in FIG. 18, a training data selecting unit 30a further includes a reconnection determining unit 37. The reconnection determining unit 37 has a function of a reconnection determining means. The reconnection determining unit 37 determines an occurrence of reconnection during operation. The reconnection determining unit 37 classifies reconnection time-series data, which is time-series data in which reconnection has occurred during operation, and reconnection assignment information that includes information about an antenna assigned to the wireless communications a predetermined length of time after reconnection time-series data. For example, the reconnection determining unit 37 stores reconnection time-series data and reconnection assignment information into the data storage unit 35 with flags set to the reconnection time-series data and the reconnection assignment information.

The data storage unit 35 stores classified reconnection time-series data and classified reconnection assignment information. The data selecting unit 36 selects reconnection time-series data and reconnection assignment information preferentially as, respectively, training data and a training label. In this manner, the training data selecting unit 30a selects the reconnection time-series data and the reconnection assignment information classified by the reconnection determining unit 37 as training data and a training label.

A case in which disconnection and reconnection occur during operation corresponds to a case in which the result of training of the learning device 20 has failed to be reflected or a case in which the learning device 20 has failed to be trained on data pertaining to a situation (a scene) in which such disconnection and reconnection occur. Therefore, incorporating such time-series data from the time when disconnection and reconnection have occurred during operation preferentially into training data makes it possible to handle such disconnection and reconnection.

Figure 19:
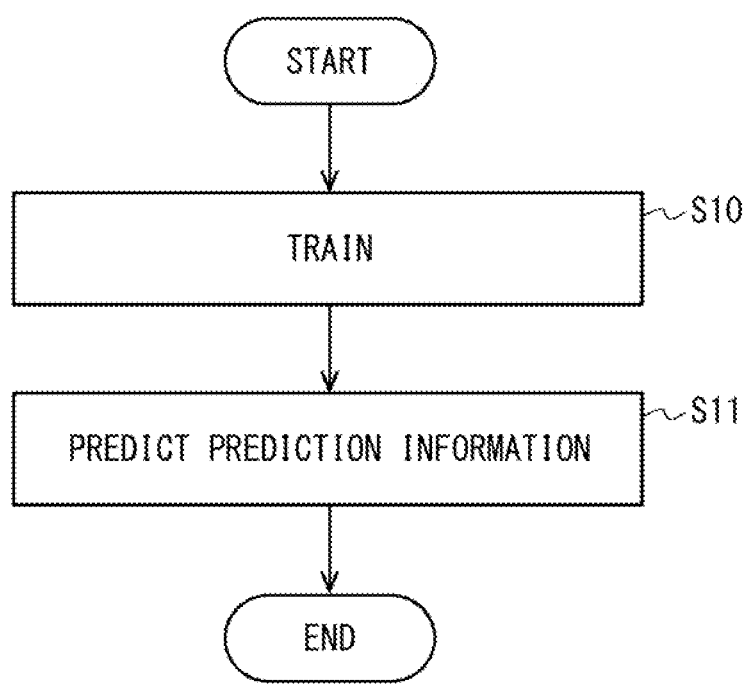
FIG. 19 is a flowchart illustrating an example of a control method according to the first example embodiment.

Next, a control method according to the first example embodiment will be described. FIG. 19 is a flowchart illustrating an example of a control method according to the first example embodiment. As indicated by step S10 of FIG. 19, the control method according to the present example embodiment further includes a step of training. In the step of training, time-series data in which pieces of radio quality information of the respective, distributedly disposed antennas AP that wirelessly communicate with the terminal device 50 are arranged in time series is used as training data during training. Furthermore, the training is performed with assignment information that includes information about an antenna AP assigned to the wireless communications a predetermined length of time after the training data used as a training label.

When the training is performed, the time-series data classified in accordance with a result of the comparison of assignment information serving as a training label and assignment information assigned to the wireless communications based on the radio quality information immediately preceding the training label in the time-series data may be selected as training data. Furthermore, when time-series data is selected as training data, the time-series data classified in accordance with a result of the comparison of the pieces of assignment information assigned to the wireless communications based on the radio quality information in the time-series data may be selected as training data.

Figure 20:
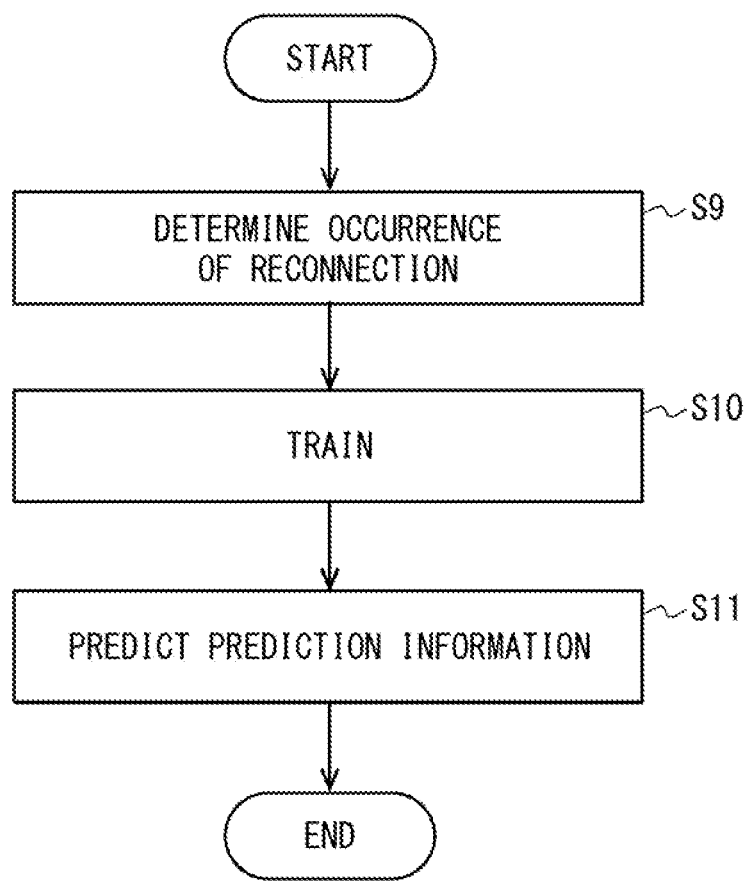
FIG. 20 is a flowchart illustrating an example of another control method according to the first example embodiment.

FIG. 20 is a flowchart illustrating an example of another control method according to the first example embodiment. As indicated by step S9 of FIG. 20, the control method may determine an occurrence of reconnection during operation. When an occurrence of reconnection is determined, reconnection time-series data, which is time-series data in which reconnection has occurred, and reconnection assignment information that includes information about an antenna AP assigned to the wireless communications a predetermined length of time after the reconnection time-series data are classified. Then, when the training at step S10 is performed, the reconnection time-series data and the reconnection assignment information may be selected as training data and a training label.

Next, some advantageous effects of the present example embodiment will be described. The control device 10 according to the present example embodiment predicts prediction information with use of the learning device 20 trained on time-series data of radio quality information of a case in which the terminal device 50 moves or a case in which a static obstruction 65 or a dynamic obstruction 66 arises. Therefore, the control device 10 can predict an antenna AP or a beam B capable of communications even in a case in which the terminal device 50 moves or obstructions 65 and 66 arise. This configuration can suppress disruption in wireless communications and improve the quality of communications.

Furthermore, the control device 10 according to the present example embodiment predicts the prediction information with sole use of the time-series data of radio quality information. This configuration can render an object detecting means that uses a camera, a radar, or the like other than those provided at a wireless base station unnecessary even in a case in which the terminal device 50 moves or a static obstruction 65 or a dynamic obstruction 66 arises.

Specifically, the predicting unit 11 of the control device 10 uses the learning device 20 trained on training data that includes data from, for example, (1) a case in which the terminal device 50 moves, (2) a case in which there is a static obstruction 65, or (3) a case in which there is a dynamic obstruction 66. This configuration can improve the accuracy of prediction of the predicting unit 11 in such cases. In the case (1) in which the terminal device 50 moves, the learning device 20 is trained, for example, on a long-term relationship of radio quality information. Meanwhile, in the case (2) in which there is a static obstruction 65 or the case (3) in which there is a dynamic obstruction 66, the learning device 20 is trained, for example, on a short-term change in radio quality information.

Furthermore, the training data selecting unit 30 enables the learning device 20 to be trained in a balanced manner on scenes with a high likelihood of beam switching, including (1) the case in which the terminal device 50 moves, (2) the case in which there is a static obstruction 65, or (3) the case in which there is a dynamic obstruction 66, in online (real time) training. This configuration can improve the accuracy of prediction in each scene.

Herein, in consideration of the Fresnel zone (a space indicating anticipated radio wave transmission), the distance, the expected moving speed, and so on in the frequency band (28 GHz or the like) of the wireless communications system 1, f=0.2 seconds, for example, may be set to the prediction time f. When the training and the prediction are performed with such a prediction time f being set, the next prediction information can be predicted upon an obstruction 65 or 66 starting to arise.

For example, in a case in which a person holding the terminal device 50 that communicates in a 28-GHz frequency band moves at a moving speed of 3 kilometers per hour (km/h, hereinafter the same), an influence of an obstruction 65 or the like appears about 0.1 seconds prior. The prediction time can be set in consideration of such Fresnel zone, distance, or anticipated moving speed. Herein, when the frequency band is higher than 28 GHz, the straightness of the beam B increases, and the beam B becomes more susceptible to disconnection. Therefore, the prediction time is set shorter than f=0.2 seconds.

As described above, the input radio quality information of each beam that can be used include not only the RSRP value but also the channel estimation information of each frequency or each RB, information such as RSSI, SINR, or CSI, the channel estimation information of an uplink signal, such as SRS, or information obtained by measuring a downlink signal, such as SSB or CSI-RS.

The prediction information of at least one of the antenna AP or the beam B to be predicted (the correct value information during training) may be information about the antenna number alone, instead of the beam number. Alternatively, in a case in which the beam number is the same as that of the current communications beam, the next (second) beam number may be used. In other words, the predicting unit 11 may be trained on and predict a beam that serves as a switching candidate. Furthermore, the predicting unit 11 may be trained on an effective beam set, which is a combination of effective beams, to define a plurality of sets, and its effective beam set number may be used as the correct value (prediction value). Specifically, a beam set of a first beam, a second beam, a third beam, and so on may be predicted.

Hence, assignment information may include a first antenna assigned to the wireless communications based on the radio quality information and a second antenna that comes next to the first antenna. Prediction information may include a third antenna to be assigned a predetermined length of time after in-operation time-series data and a fourth antenna that comes next to the third antenna. Furthermore, assignment information may be an assignment set that includes at least a first antenna assigned to the wireless communications based on the radio quality information and a second antenna that comes next to the first antenna, and prediction information may be a prediction set that includes at least a third antenna to be assigned a predetermined length of time after in-operation time-series data and a fourth antenna that comes next to the third antenna. Furthermore, the above description applies not only to the antennas AP but also to the beams B. In other words, assignment information may include a first beam assigned to the wireless communications based on the radio quality information and a second beam that comes next to the first beam. Prediction information may include a third beam to be assigned a predetermined length of time after in-operation time-series data and a fourth beam that comes next to the third beam. Furthermore, assignment information may be an assignment set that includes at least a first beam assigned to the wireless communications based on the radio quality information and a second beam that comes next to the first beam, and prediction information may be a prediction set that includes at least a third beam to be assigned a predetermined length of time after in-operation time-series data and a fourth beam that comes next to the third beam.

The training data selecting unit 30 during training may incorporate the time-series data in which disconnection and reconnection have occurred during operation preferentially into training data. This configuration makes it possible to handle disconnection and reconnection.

As to the input radio quality information, any value no greater than a certain threshold may be converted to zero and then input. This configuration can increase the likelihood of achieving sparseness of input data, which in turn can lead to the advantages of increased efficiency of training or increased accuracy through application of training techniques specialized for sparseness.

A function of working out the order of arranging beams in the input radio quality information may be added. For example, the beams in the radio quality information may be arranged along a path that the terminal device 50 moves along, and this configuration can improve the training efficiency of the learning device 20 and the prediction efficiency of the predicting unit 11.

The wireless communications system 1 according to the present example embodiment may be applied not only to millimeter-wave wireless communications but also to, for example but not limited to, terahertz-wave (sub-terahertz-wave) wireless communications, optical space communications (free optical space communications), or visible light communications (optical wireless communications).

Second Example Embodiment

Figure 21:
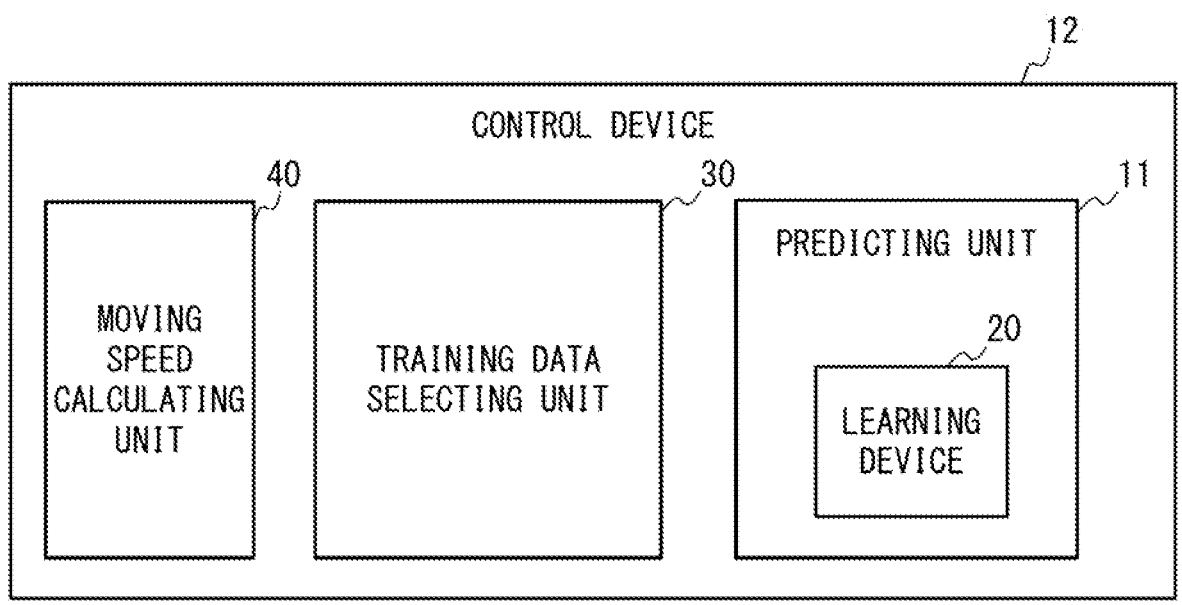
FIG. 21 is a block diagram illustrating an example of a control device according to a second example embodiment.

Next, a control device according to a second example embodiment will be described. The control device according to the present example embodiment utilizes movement information of a terminal device 50. For example, the control device according to the present example embodiment calculates the moving speed of the terminal device 50 and outputs the calculated moving speed of the terminal device 50 to a training data selecting unit 30. FIG. 21 is a block diagram illustrating an example of the control device according to the second example embodiment. As illustrated in FIG. 21, a control device 12 according to the present example embodiment includes a moving speed calculating unit 40. The moving speed calculating unit 40 has a function of a moving speed calculating means.

The moving speed calculating unit 40 calculates the moving speed of the terminal device 50. The moving speed calculating unit 40 performs, for example, a position estimating process with use of radio quality information. Then, the moving speed calculating unit 40 may calculate the moving speed of the terminal device 50 from a plurality of position estimation results. For example, the moving speed calculating unit 40 may calculate the moving speed of the terminal device 50 from a change in the intensity of each beam B. Furthermore, for example, the moving speed calculating unit 40 may calculate the moving speed of the terminal device 50 from a positional relationship of the assigned antennas AP and of the assigned beams B. Furthermore, the moving speed calculating unit 40 may calculate the moving speed of the terminal device 50 with use of a result of triangulation of a plurality of antennas AP. Furthermore, the moving speed calculating unit 40 may estimate a Doppler frequency from radio quality information and calculate the moving speed of the terminal device 50 from the estimated Doppler frequency. The moving speed that the moving speed calculating unit 40 calculates is output to the training data selecting unit 30.

Figure 22:
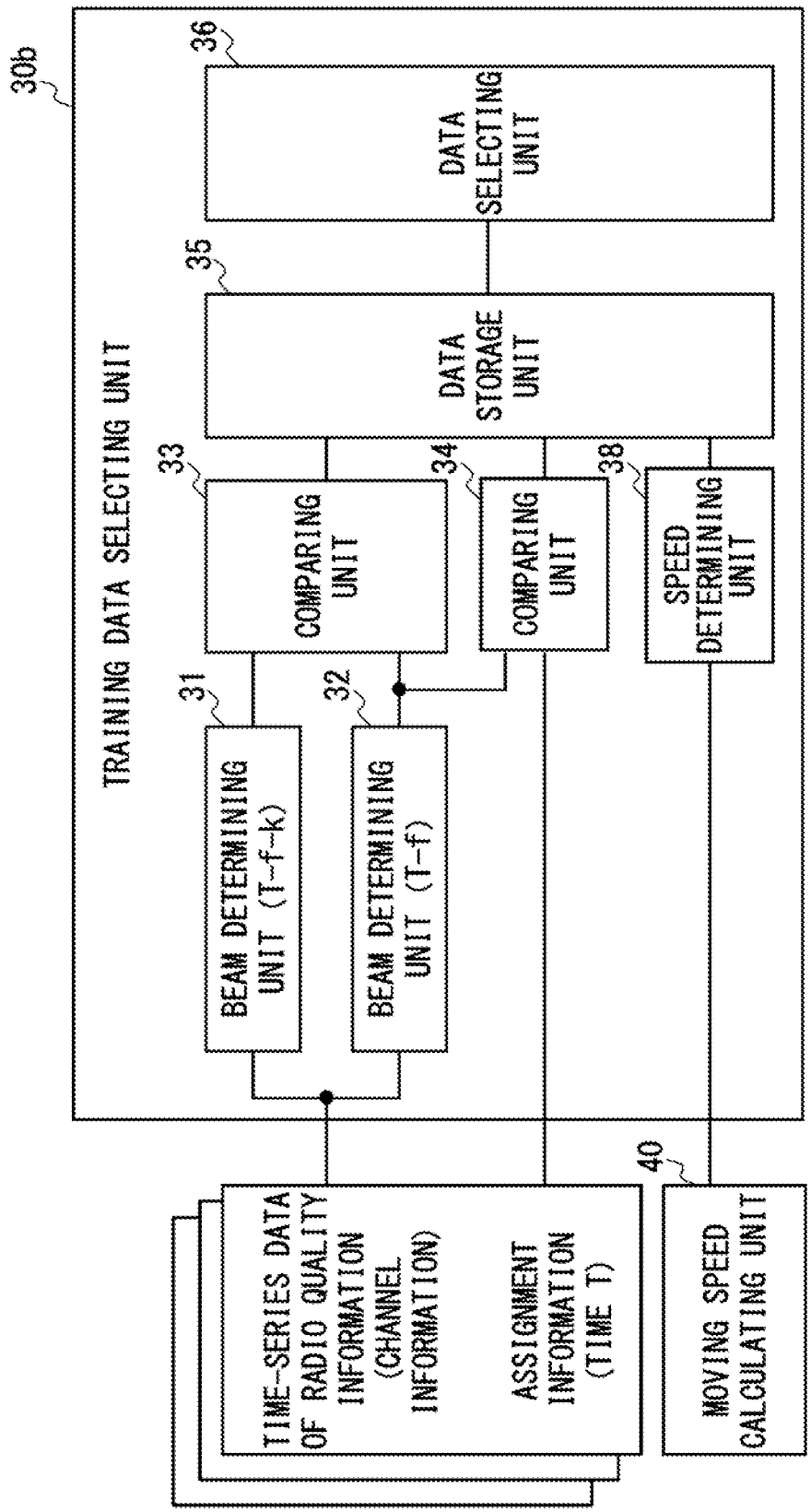
FIG. 22 is a block diagram illustrating an example of a training data selecting unit in the control device according to the second example embodiment.

FIG. 22 is a block diagram illustrating an example of a training data selecting unit in the control device 12 according to the second example embodiment. As illustrated in FIG. 22, a training data selecting unit 30b according to the present example embodiment further includes a speed determining unit 38. The speed determining unit 38 has a function of a speed determining means.

The speed determining unit 38 determines the moving speed of the terminal device 50. For example, the speed determining unit 38 determines and classifies the moving speed of the terminal device 50 into one of low speed, mid speed, and high speed categories, for example. The low speed category is, for example, for the moving speed of higher than 0 km/h but no higher than 3 km/h. The mid speed category is, for example, for the moving speed of higher than 3 km/h but no higher than 30 km/h. The high speed category is, for example, for the moving speed of higher than 30 km/h. The number of categories and the speed values of each category are not limited to the examples above and may be changed depending on the environment in which the control device 12 is installed. The speed determining unit 38 classifies time-series data into one of the plurality of moving speed categories with use of information about the moving speed of the terminal device 50 calculated from radio quality information.

The data storage unit 35 stores time-series data with the time-series data classified in one of the plurality of moving speed categories. The data selecting unit 36 may select data such that pieces of data in the respective moving speed categories are used for training in a balanced manner. In this manner, the training data selecting unit 30b selects, as training data, time-series data classified in accordance with the movement information of the terminal device 50 calculated from the time-series data. Specifically, the training data selecting unit 30b classifies time-series data into one of the plurality of moving speed categories, including, for example, low speed, mid speed, and high speed categories, with use of the terminal's movement information calculated from radio quality information and, when selecting training data, selects data such that the time-series data in these categories are used for training in a balanced manner.

According to the present example embodiment, the control device 12 determines the moving speed of the terminal device 50 and selects, as training data, time-series data of the determined moving speed categories in a balanced manner. Hence, training is performed in consideration of the moving speed of the terminal device 50, and thus the accuracy of predicting prediction information can be improved. Configuration and advantageous effects other than those described above are contained in the description of the first example embodiment.

Third Example Embodiment

Next, a control device according to a third example embodiment will be described. The control device according to the present example embodiment is similar to the control device according to the second example embodiment in that it utilizes movement information of a terminal device 50. The control device according to the present example embodiment, however, calculates the moving speed of the terminal device 50 and outputs the calculated moving speed of the terminal device 50 to a learning device 20 of a predicting unit 11.

Figure 23:
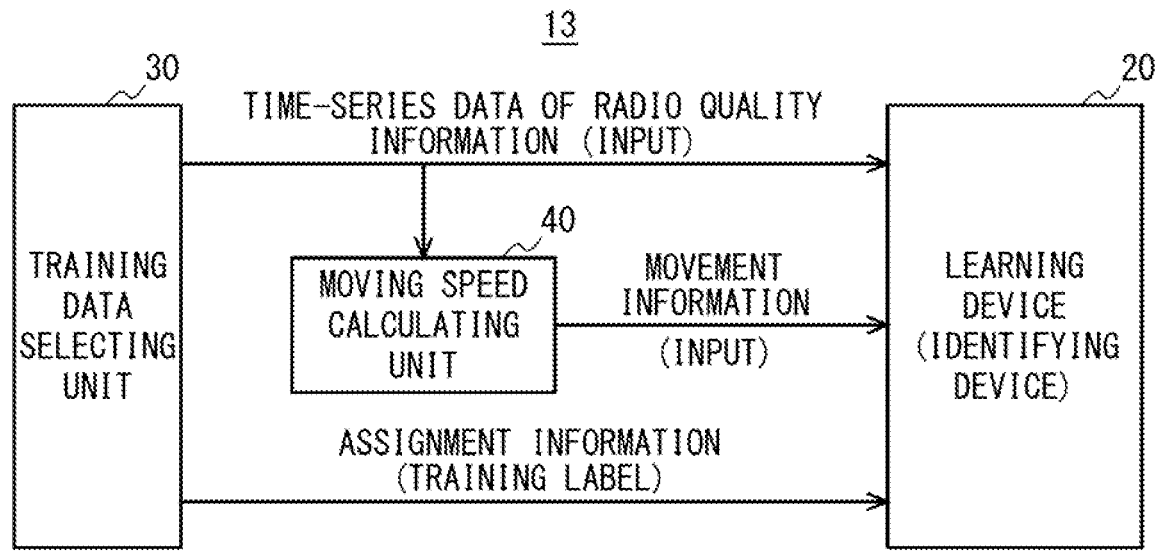
FIG. 23 illustrates an example of a flow of training data and a training label input to a learning device during training in a control device according to a third example embodiment.

FIG. 23 illustrates an example of a flow of training data and a training label input to the learning device 20 during training in the control device according to the third example embodiment. As illustrated in FIG. 23, during training, a moving speed calculating unit 40 of a control device 13 calculates the moving speed of the terminal device 50 from the time-series data of radio quality information. The moving speed calculating unit 40 inputs movement information including the calculated moving speed of the terminal device 50 into the learning device 20 as training data. The learning device 20 is trained with, in addition to the time-series data, the moving speed of the terminal device 50 used as training data. In other words, the movement information of the terminal device 50 calculated from the time-series data is incorporated into the training data for the learning device 20. In this case, the learning device 20 may be trained with assignment information used as a training label.

Figure 24:
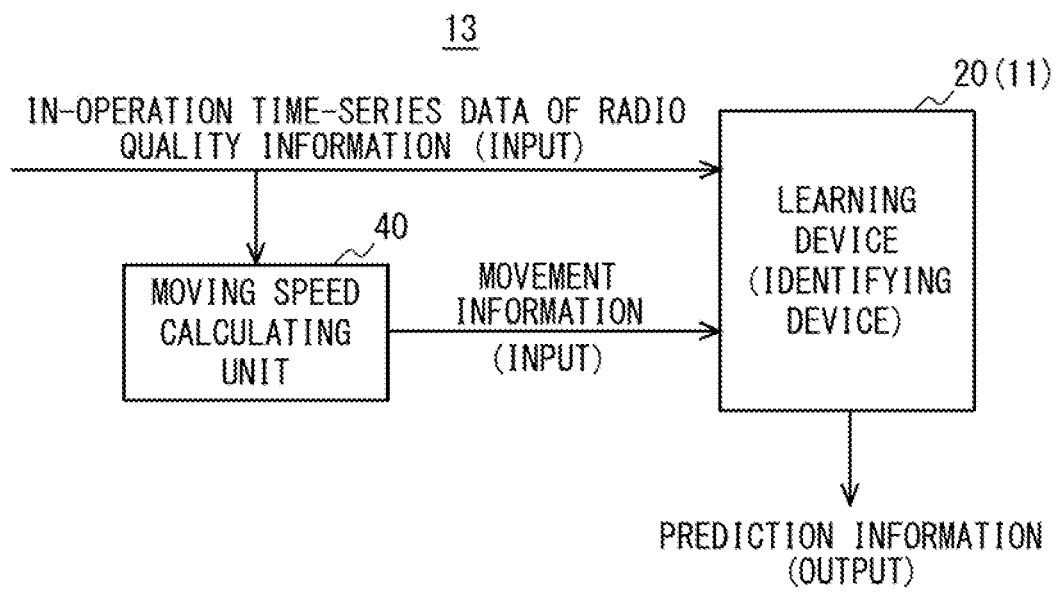
FIG. 24 illustrates an example of a flow of in-operation time-series data and movement information of a terminal device that are input to a predicting unit that predicts prediction information with use of a learning device during operation in the control device according to the third example embodiment.

FIG. 24 illustrates an example of a flow of in-operation time-series data and movement information of the terminal device 50 input to the predicting unit 11 that predicts prediction information during operation with use of the learning device 20 in the control device 13 according to the third example embodiment. As illustrated in FIG. 24, during operating, the moving speed calculating unit 40 calculates the moving speed of the terminal device 50 from the in-operation time-series data of the radio quality information. The moving speed calculating unit 40 inputs the calculated moving speed of the terminal device 50 into the predicting unit 11. The predicting unit 11 predicts the prediction information based on, in addition to the in-operation time-series data, the moving speed of the terminal device 50, with use of the learning device 20.

Figure 25:
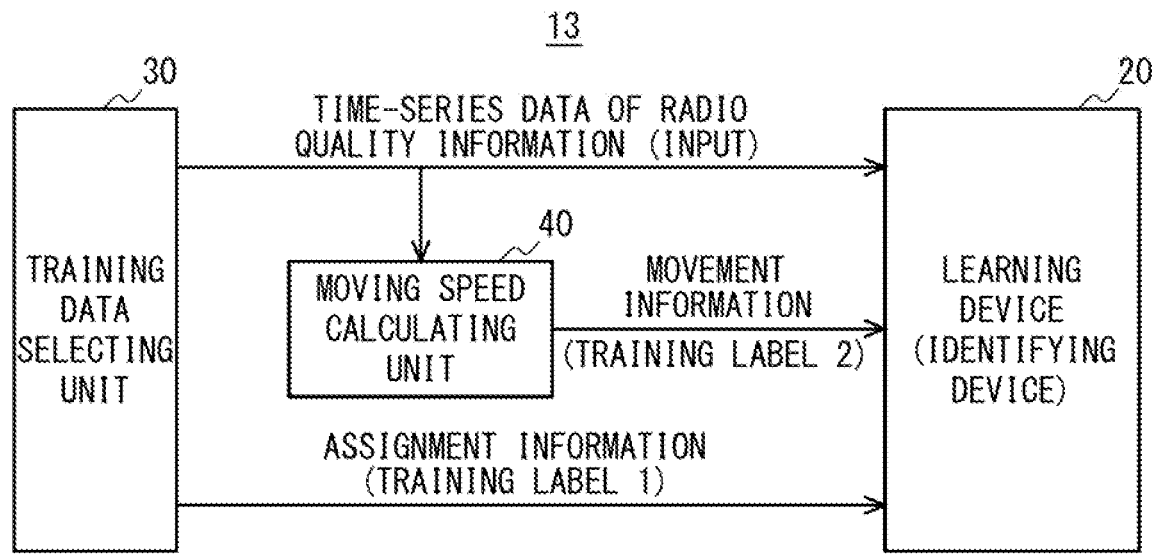
FIG. 25 illustrates an example of another flow of training data and a training label that are input to the learning device during training in the control device according to the third example embodiment.

FIG. 25 illustrates an example of another flow of training data and a training label input to the learning device 20 during training in the control device 13 according to the third example embodiment. As illustrated in FIG. 25, during training, the moving speed calculating unit 40 calculates the moving speed of the terminal device 50 from time-series data of radio quality information. The moving speed calculating unit 40 may input the calculated moving speed of the terminal device 50 into the learning device 20 as a training label. The learning device 20 is trained with, in addition to the assignment information, the moving speed of the terminal device 50 used as a training label. Thus, the learning device 20 may be trained through multitask training. The learning device 20 is trained with the time-series data used as training data.

Figure 26:
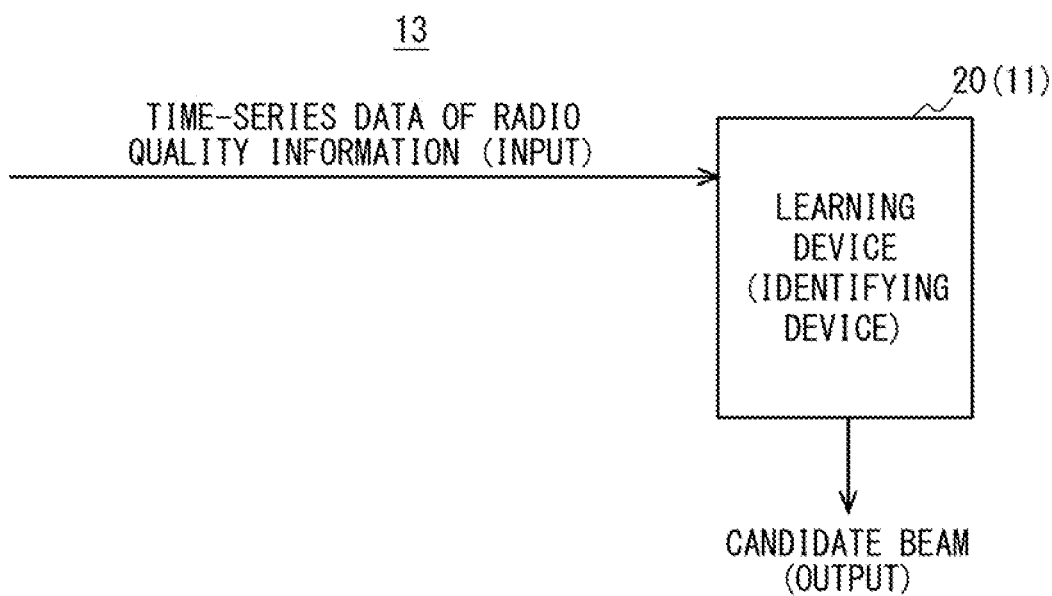
FIG. 26 illustrates an example of another flow of in-operation time-series data input to the predicting unit that predicts prediction information with use of the learning device during operation in the control device according to the third example embodiment.

FIG. 26 illustrates an example of another flow of in-operation time-series data input to the predicting unit 11 that predicts prediction information during operation with use of the learning device 20 in the control device 13 according to the third example embodiment. As illustrated in FIG. 26, during operation, the predicting unit 11 predicts the prediction information based on the in-operation time-series data with use of the learning device 20. In this example, although not illustrated in FIG. 26, the predicting unit 11 can predict and output the moving speed with use of the learning device 20 trained through multitasking training described above.

According to the present example embodiment, since the learning device 20 is trained with the moving speed of the terminal device 50 used as training data or a training label, the accuracy of predicting the prediction information can be improved. Furthermore, since the predicting unit 11 predicts the prediction information based on, in addition to the in-operation time-series data, the moving speed of the terminal device 50, the accuracy of predicting the prediction information can be improved. Configuration and advantageous effects other than those described above are contained in the description of the first or second example embodiment.

Fourth Example Embodiment

Figure 27:
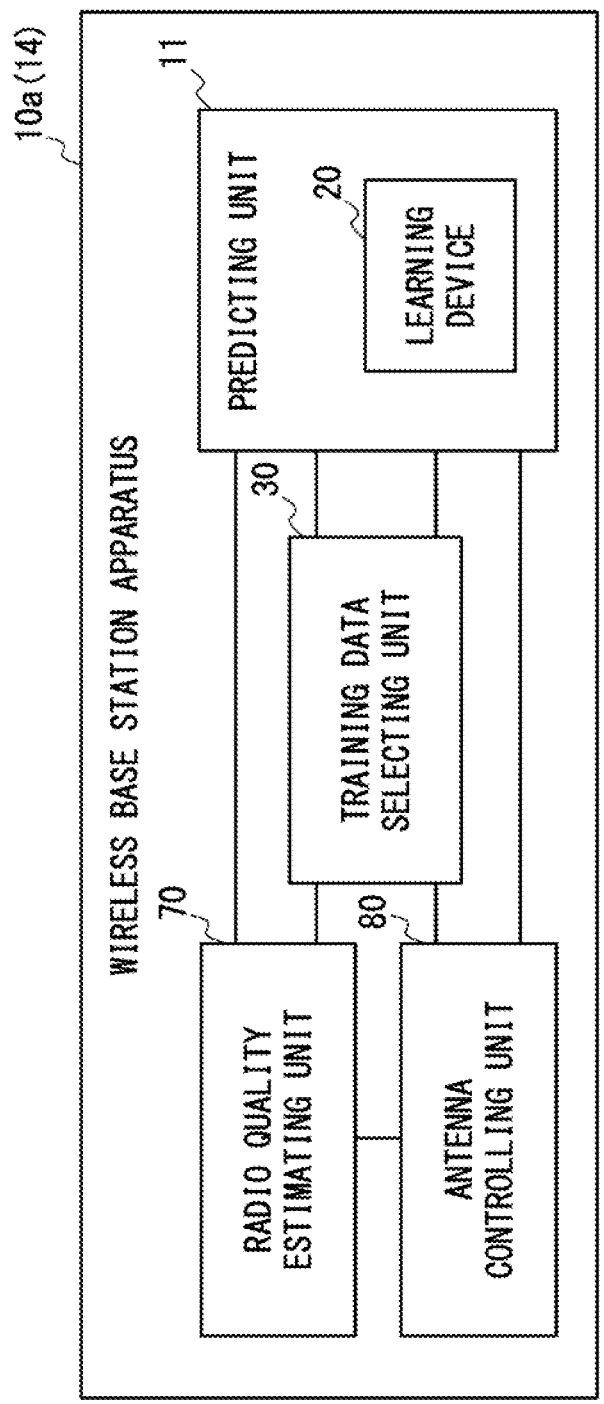
FIG. 27 is a block diagram illustrating an example of a wireless base station apparatus in which a control device according to a fourth example embodiment is provided.

Next, a control device according to a fourth example embodiment will be described. The present example embodiment provides details of a case in which a control device is provided in a wireless base station apparatus and details of a case in which a control device is provided in a RIC apparatus. FIG. 27 is a block diagram illustrating an example of a wireless base station apparatus in which the control device according to the fourth example embodiment is provided. As illustrated in FIG. 27, a control device 14 may be provided in a wireless base station apparatus 10a. It has been stated above that the control device 14 may be provided in RU, DU, CU, or the like of the wireless base station apparatus 10a. The control device 14 may further include a radio quality estimating unit 70 and an antenna controlling unit 80, in addition to a predicting unit 11, a learning device 20, and a training data selecting unit 30. The radio quality estimating unit 70 and the antenna controlling unit 80 have functions of, respectively, a radio quality estimating means and an antenna controlling means.

The radio quality estimating unit 70 estimates the radio quality information of each of a plurality of distributedly disposed antennas AP that wirelessly communicate with the terminal device 50. For example, the radio quality estimating unit 70 measures the RSRP or the like described above of each antenna and estimates the radio quality information. The radio quality estimating unit 70 outputs the estimated radio quality information to the antenna controlling unit 80. Furthermore, the radio quality estimating unit 70 outputs the estimated radio quality information to the training data selecting unit 30. Furthermore, the radio quality estimating unit 70 outputs the estimated radio quality information to the predicting unit 11. Herein, the radio quality estimating unit 70 may determine whether the wireless communications with the terminal device 50 have been disconnected or reconnected, based on the estimated radio quality information. Alternatively, the radio quality estimating unit 70 may acquire, from the terminal device 50, information indicating whether the wireless communications have been reconnected. Then, the radio quality estimating unit 70 may output this reconnection information to the training data selecting unit 30.

The antenna controlling unit 80 receives radio quality information from the radio quality estimating unit 70. The antenna controlling unit 80 controls antennas AP to be assigned to the wireless communications based on the radio quality information. Specifically, the antenna controlling unit 80 determines an antenna AP to be assigned to the wireless communications. The antenna controlling unit 80 may determine, in addition to an antenna AP to be assigned to the wireless communications, a beam B to be assigned to the wireless communications. For example, the antenna controlling unit 80 may select candidates for the antenna AP and the beam B to be assigned to the wireless communications from the radio quality information and determine the antenna AP and the beam B to be actually assigned from the candidates for the antenna AP and the beam B. Furthermore, the antenna controlling unit 80 may determine not only the antenna AP and the beam B to be actually assigned but also a candidate antenna AP and a candidate beam B for measuring the radio quality as candidates to be assigned. In this manner, the antenna controlling unit 80 determines assignment information that includes information about an antenna to be assigned to the wireless communications based on the radio quality information. The antenna controlling unit 80 outputs the assignment information to the training data selecting unit 30.

The training data selecting unit 30 receives radio quality information from the radio quality estimating unit 70. The training data selecting unit 30 selects training data from the time-series data of the radio quality information received from the radio quality estimating unit 70. The training data selecting unit 30 outputs the selected training data to the learning device 20.

Furthermore, the training data selecting unit 30 receives assignment information from the antenna controlling unit 80. The training data selecting unit 30 selects a training label from the assignment information received from the antenna controlling unit 80. The training data selecting unit 30 outputs the selected training label to the learning device 20. The learning device 20 is trained on the training data and the training label received from the training data selecting unit 30.

The predicting unit 11, with the use of the learning device 20, predicts prediction information (an antenna AP or a beam B to be assigned a predetermined length of time after in-operation time-series data) based on the time-series data of in-operation radio quality information received from the radio quality estimating unit 70. The predicting unit 11 outputs the prediction information to the antenna controlling unit 80.

The antenna controlling unit 80 may add the antenna AP or the beam B in the prediction information predicted by the predicting unit 11 to the candidates for the antenna AP or the beam B to be assigned to the wireless communications. Furthermore, the antenna controlling unit 80 may add the antenna AP or the beam B in the prediction information predicted by the predicting unit 11 to candidate antennas AP or candidate beams B for measuring the radio quality.

Figure 28:
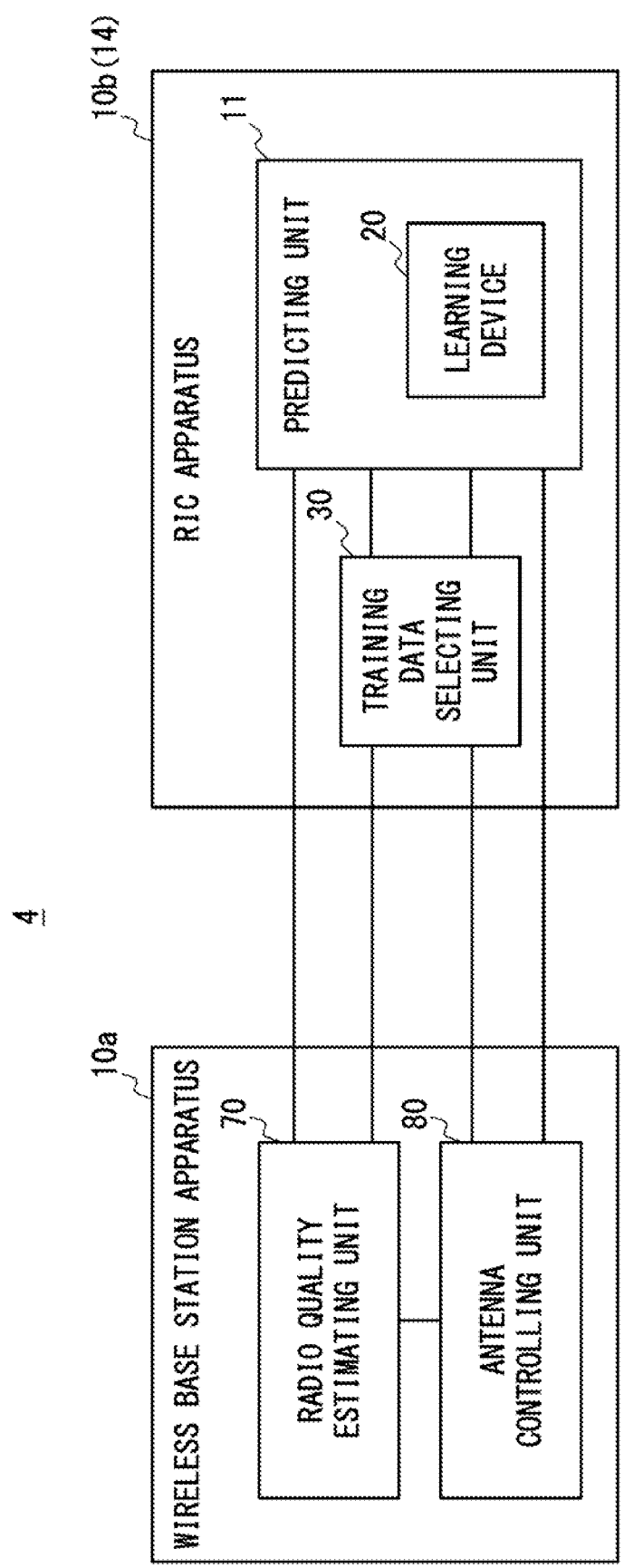
FIG. 28 is a block diagram illustrating an example of a RIC apparatus in which the control device according to the fourth example embodiment is provided.

FIG. 28 is a block diagram illustrating an example of a RIC apparatus in which the control device 14 according to the fourth example embodiment is provided. As illustrated in FIG. 28, in a wireless communications system 4 according to the present example embodiment, the control device 14 may be provided in a RIC apparatus 10b. The control device 14, provided in the RIC apparatus 10b, includes a predicting unit 11, a learning device 20, and a training data selecting unit 30. The RIC apparatus 10b is connected to a wireless base station apparatus 10a. There may be one or more wireless base station apparatuses 10a connected to the RIC apparatus 10b. The wireless base station apparatus 10a includes a radio quality estimating unit 70 and an antenna controlling unit 80.

The radio quality estimating unit 70 of the wireless base station apparatus 10a outputs estimated radio quality information to the antenna controlling unit 80 of the wireless base station apparatus 10a. Furthermore, the radio quality estimating unit 70 outputs the estimated radio quality information to the training data selecting unit 30 and the predicting unit 11 of the RIC apparatus 10b. Furthermore, the radio quality estimating unit 70 may output determined or acquired reconnection information to the training data selecting unit 30.

The antenna controlling unit 80 of the wireless base station apparatus 10a outputs determined assignment information to the training data selecting unit 30 of the RIC apparatus 10b.

The training data selecting unit 30 of the RIC apparatus 10b receives radio quality information from the radio quality estimating unit 70 of the wireless base station apparatus 10a and receives assignment information from the antenna controlling unit 80. The training data selecting unit 30 selects training data and a training label from the time-series data of the received radio quality information and the assignment information. The training data selecting unit 30 outputs the selected training data and training label to the learning device 20. The learning device 20 of the RIC apparatus 10b is trained on the training data and the training label received from the training data selecting unit 30.

With the use of the learning device 20, the predicting unit 11 of the RIC apparatus 10b predicts prediction information (an antenna AP or a beam B to be assigned a predetermined length of time after in-operation time-series data) based on the time-series data of in-operation radio quality information received from the radio quality estimating unit 70 of the wireless base station apparatus 10a. The predicting unit 11 outputs the prediction information to the antenna controlling unit 80 of the wireless base station apparatus 10a.

The antenna controlling unit 80 may add the antenna AP or the beam B in the prediction information predicted by the predicting unit 11 of the RIC apparatus 10b to the candidates for the antenna AP or the beam B to be assigned to the wireless communications. Furthermore, the antenna controlling unit 80 may add the antenna AP or the beam B in the prediction information predicted by the predicting unit 11 to candidate antennas AP or candidate beams B for measuring the radio quality.

Herein, the learning device 20 during training may be implemented into an external processing apparatus other than the wireless base station apparatus 10a or the RIC apparatus 10b. In this case, during training, prestored training data is output to the learning device 20 of the processing apparatus from the training data selecting unit 30, and the training is performed in the processing apparatus. Alternatively, part or the whole of the training data selecting unit 30 may be implemented in a processing apparatus. Then, during operation, the trained learning device 20 is transferred from the processing apparatus to the predicting unit 11 implemented in the wireless base station apparatus 10*a* or the like, and then the predicting is performed.

According to the present example embodiment, the control device 14 may be provided in the wireless base station apparatus 10*a* or in the RIC apparatus 10*b*. Therefore, the flexibility of configuration of the wireless communications system 4 can be improved. Furthermore, when the control device 14 is provided in the RIC apparatus 10*b*, a plurality of wireless base station apparatuses 10*a* can be controlled, which leads to improved efficiency. Configuration and advantageous effects other than those described above are contained in the description of the first, second, or third example embodiment.

The present disclosure is not limited to the example embodiments described above, and modifications can be made, as appropriate, within the scope that does not depart from the spirit of the present disclosure. For example, an embodiment obtained by combining components of the first to fourth example embodiments is also encompassed by the scope of the technical spirit. Furthermore, a control program that causes a computer to execute the control method is also encompassed by the scope of the technical spirit.

The program includes a set of instructions (or software codes) that, when loaded onto the control device 10 or the like that includes a computer, causes the computer to execute one or more functions described according to the example embodiments. The program may be stored in a non-transitory computer-readable medium or in a tangible storage medium. As some non-limiting examples, the computer-readable medium or the tangible storage medium includes a random-access memory (RAM), a read-only memory (ROM), a flash memory, a solid-state drive (SSD), or other memory technologies; a CD-ROM, a digital versatile disc (DVD), a Blu-ray (registered trademark) disc, or other optical disc storages; or a magnetic cassette, a magnetic tape, a magnetic disk storage, or other magnetic storage devices. The program may be transmitted via a transitory computer-readable medium or via a communications medium. As some non-limiting examples, the transitory computer-readable medium or the communications medium includes an electrical, optical, or acoustic propagation signal or a propagation signal of other forms.

Part or the whole of the foregoing example embodiments can also be expressed as in the following supplementary notes, which are not limiting.

(Supplementary Note A1)

A control device configured to predict prediction information based on in-operation time-series data by use of a learning device, the learning device being trained, during training,
 (i) with time-series data, using as training data, in which pieces of radio quality information of respective antennas that are disposed in a distributed manner and that perform wireless communications with a terminal device are arranged in time series, and
 (ii) with assignment information, using as a training label, that includes information about the antenna assigned, from the training data, to the wireless communications after a predetermined length of time, wherein
 the in-operation time-series data being the time-series data acquired during operation, and
 the prediction information including information about the antenna to be assigned, from the in-operation time-series data, to the wireless communications after the predetermined length of time.

(Supplementary Note A2)

The control device according to Supplementary Note A1, comprising a training data selecting unit configured to select, as the training data during the training, the time-series data classified in accordance with a result of a comparison of the assignment information used as the training label and the assignment information assigned to the wireless communications based on the radio quality information immediately preceding the training label in the time-series data.

(Supplementary Note A3)

The control device according to Supplementary Note A2, wherein the training data selecting unit is configured to select, as the training data, the time-series data classified in accordance with a result of a comparison of pieces of assignment information assigned to the wireless communications based on respective pieces of radio quality information in the time-series data.

(Supplementary Note A4)

The control device according to Supplementary Note A2 or A3, further comprising a reconnection determining unit configured to determine an occurrence of reconnection during the operation, wherein
 the reconnection determining unit is configured to classify reconnection time-series data served by the time-series data in which the reconnection has occurred and reconnection assignment information that includes information about the antenna assigned to the wireless communications the predetermined length of time after the reconnection time-series data, and
 the training data selecting unit is configured to select the reconnection time-series data and the reconnection assignment information as the training data and the training label.

(Supplementary Note A5)

The control device according to any one of Supplementary Notes A2 to A4, wherein the training data selecting unit is configured to select, as the training data, the time-series data classified in accordance with movement information of the terminal device calculated from the time-series data.

(Supplementary Note A6)

The control device according to any one of Supplementary Notes A1 to A5, further comprising an antenna controlling unit configured control the antenna to be assigned to the wireless communications based on the radio quality information,
 wherein the antenna controlling unit is configured to add the prediction information to a candidate antenna that is a candidate for the antenna to be assigned based on the radio quality information.

(Supplementary Note A7)

The control device according to any one of Supplementary Notes A1 to A6, wherein the assignment information and the prediction information include information about a beam to be input or output with use of a plurality of antenna elements of the antenna.

(Supplementary Note A8)

The control device according to any one of Supplementary Notes A1 to A7, wherein the radio quality information includes at least one of signal power information of RSRP or RSSI of the antenna or channel estimation information of each frequency or each RB.

(Supplementary Note A9)

The control device according to any one of Supplementary Notes A1 to A8, wherein
the assignment information includes a first antenna assigned to the wireless communications based on the radio quality information and a second antenna that comes next to the first antenna, and
the prediction information includes a third antenna to be assigned the predetermined length of time after the in-operation time-series data and a fourth antenna that comes next to the third antenna.

(Supplementary Note A10)

The control device according to any one of Supplementary Notes A1 to A8, wherein
the assignment information is an assignment set that includes at least a first antenna assigned to the wireless communications based on the radio quality information and a second antenna that comes next to the first antenna, and
the prediction information is a prediction set that includes at least a third antenna to be assigned the predetermined length of time after the in-operation time-series data and a fourth antenna that comes next to the third antenna.

(Supplementary Note A11)

The control device according to Supplementary Note A7, wherein
the assignment information includes a first beam assigned to the wireless communications based on the radio quality information and a second beam that comes next to the first beam, and
the prediction information includes a third beam to be assigned the predetermined length of time after the in-operation time-series data and a fourth beam that comes next to the third beam.

(Supplementary Note A12)

The control device according to Supplementary Note A7, wherein
the assignment information is an assignment set that includes at least a first beam assigned to the wireless communications based on the radio quality information and a second beam that comes next to the first beam, and
the prediction information is a prediction set that includes at least a third beam to be assigned the predetermined length of time after the in-operation time-series data and a fourth beam that comes next to the third beam.

(Supplementary Note A13)

The control device according to any one of Supplementary Notes A1 to A12, wherein the learning device incorporates movement information of the terminal device calculated from the time-series data into the training data.

(Supplementary Note A14)

The control device according to any one of Supplementary Notes A1 to A13, wherein the radio quality information includes information to be input upon a value no greater than a certain threshold being replaced by zero or a lower limit.

(Supplementary Note B1)

A wireless communications system, comprising:
a plurality of antennas disposed in a distributed manner and configured to perform wireless communications with a terminal device; and
a control device configured to predict prediction information based on in-operation time-series data by use of a learning device, the learning device being trained, during training,
(i) with time-series data, using as training data, in which pieces of radio quality information of the respective antennas are arranged in time series, and
(ii) with assignment information, using as a training label, that includes information about the antenna assigned, from the training data, to the wireless communications after a predetermined length of time, wherein
the in-operation time-series data being the time-series data acquired during operation, and
the prediction information including information about the antenna to be assigned, from the in-operation time-series data, to the wireless communications after the predetermined length of time.

(Supplementary Note B2)

The wireless communications system according to Supplementary Note B1, wherein the control device further includes a training data selecting unit configured to select, as the training data during the training, the time-series data classified in accordance with a result of a comparison of the assignment information used as the training label and the assignment information assigned to the wireless communications based on the radio quality information immediately preceding the training label in the time-series data.

(Supplementary Note B3)

The wireless communications system according to Supplementary Note B2, wherein the training data selecting unit is configured to select, as the training data, the time-series data classified in accordance with a result of a comparison of pieces of assignment information assigned to the wireless communications based on respective pieces of radio quality information in the time-series data.

(Supplementary Note B4)

The wireless communications system according to Supplementary Note B2 or B3, wherein
the control device further includes a reconnection determining unit configured to determine an occurrence of reconnection during the operation,
the reconnection determining unit is configured to classify reconnection time-series data served by the time-series data in which the reconnection has occurred and reconnection assignment information that includes information about the antenna assigned to the wireless communications the predetermined length of time after the reconnection time-series data, and
the training data selecting unit is configured to select the reconnection time-series data and the reconnection assignment information as the training data and the training label.

(Supplementary Note B5)

The wireless communications system according to any one of Supplementary Notes B2 to B4, wherein the training data selecting unit is configured to select, as the training data, the time-series data classified in accordance with movement information of the terminal device calculated from the time-series data.

(Supplementary Note B6)

The wireless communications system according to any one of Supplementary Notes B1 to B5, wherein the assignment information and the prediction information include information about a beam to be input or output with use of a plurality of antenna elements of the antenna.

(Supplementary Note B7)

The wireless communications system according to any one of Supplementary Notes B1 to B6, wherein the radio quality information includes at least one of signal power information of RSRP or RSSI of the antenna or channel estimation information of each frequency or each RB.

(Supplementary Note B8)

The wireless communications system according to any one of Supplementary Notes B1 to B7, wherein
- the assignment information includes a first antenna assigned to the wireless communications based on the radio quality information and a second antenna that comes next to the first antenna, and
- the prediction information includes a third antenna to be assigned the predetermined length of time after the in-operation time-series data and a fourth antenna that comes next to the third antenna.

(Supplementary Note B9)

The wireless communications system according to any one of Supplementary Notes B1 to B7, wherein
- the assignment information is an assignment set that includes at least a first antenna assigned to the wireless communications based on the radio quality information and a second antenna that comes next to the first antenna, and
- the prediction information is a prediction set that includes at least a third antenna to be assigned the predetermined length of time after the in-operation time-series data and a fourth antenna that comes next to the third antenna.

(Supplementary Note B10)

The wireless communications system according to Supplementary Note B6, wherein
- the assignment information includes a first beam assigned to the wireless communications based on the radio quality information and a second beam that comes next to the first beam, and
- the prediction information includes a third beam to be assigned the predetermined length of time after the in-operation time-series data and a fourth beam that comes next to the third beam.

(Supplementary Note B11)

The wireless communications system according to Supplementary Note B6, wherein
- the assignment information is an assignment set that includes at least a first beam assigned to the wireless communications based on the radio quality information and a second beam that comes next to the first beam, and
- the prediction information is a prediction set that includes at least a third beam to be assigned the predetermined length of time after the in-operation time-series data and a fourth beam that comes next to the third beam.

(Supplementary Note B12)

The wireless communications system according to any one of Supplementary Notes B1 to B11, wherein the learning device incorporates movement information of the terminal device calculated from the time-series data into the training data.

(Supplementary Note B13)

The wireless communications system according to any one of Supplementary Notes B1 to B12, wherein the radio quality information includes information to be input upon a value no greater than a certain threshold being replaced by zero or a lower limit.

(Supplementary Note B14)

The wireless communications system according to any one of Supplementary Notes B1 to B13, wherein
- the control device further includes an antenna controlling unit configured control the antenna to be assigned to the wireless communications based on the radio quality information, and
- the antenna controlling unit is configured to add the prediction information predicted by the predicting unit to a candidate antenna that is a candidate for the antenna to be assigned based on the radio quality information.

(Supplementary Note B15)

The wireless communications system according to any one of Supplementary Notes B1 to B14, wherein the control device is provided in a wireless base station apparatus.

(Supplementary Note B16)

The wireless communications system according to any one of Supplementary Notes B1 to B13, further comprising a RIC configured to control one or more wireless base station apparatuses,
- wherein the control device is
  - provided in the RIC,
  - configured to acquire the radio quality information from at least one of the wireless base station apparatuses, and
  - configured to output the prediction information to at least one of the wireless base station apparatuses.

(Supplementary Note C1)

A control method comprising:
- predicting prediction information based on in-operation time-series data by use of a learning device, the learning device being trained, during training,
  - (i) with time-series data, using as training data, in which pieces of radio quality information of respective antennas that are disposed in a distributed manner and that perform wireless communications with a terminal device are arranged in time series, and
  - (ii) with assignment information, using as a training label, that includes information about the antenna assigned, from the training data, to the wireless communications after a predetermined length of time, wherein
- the in-operation time-series data being the time-series data acquired during operation, and
- the prediction information including information about the antenna to be assigned, from the in-operation time-series data, to the wireless communications after the predetermined length of time.

(Supplementary Note C2)

The control method according to Supplementary Note C1, wherein
- during the training, the training is performed with time-series data in which pieces of radio quality information of respective antennas that are disposed in a distributed manner and that perform wireless communications with a terminal device are arranged in time series used as training data and with assignment information that includes information about the antenna assigned to the wireless communications a predetermined length of time after the training data used as a training label, and
- when the training is performed, the time-series data classified in accordance with a result of a comparison of the assignment information used as the training label and the assignment information assigned to the wireless communications based on the radio quality information immediately preceding the training label in the time-series data is selected as the training data.

(Supplementary Note C3)

The control method according to Supplementary Note C2, wherein when the training data is selected, the time-series data classified in accordance with a result of a comparison of pieces of assignment information assigned to the wireless communications based on respective pieces of radio quality information in the time-series data is selected as the training data.

(Supplementary Note C4)

The control method according to Supplementary Note C2 or C3, wherein
an occurrence of reconnection during the operation is determined, and
when an occurrence of reconnection is determined,
reconnection time-series data served by the time-series data in which the reconnection has occurred and reconnection assignment information that includes information about the antenna assigned to the wireless communications the predetermined length of time after the reconnection time-series data are classified, and
the reconnection time-series data and the reconnection assignment information are selected as the training data and the training label.

(Supplementary Note C5)

The control method according to Supplementary Note C2 or C3, wherein when the training data is selected, the time-series data classified in accordance with movement information of the terminal device calculated from the time-series data is selected as the training data.

(Supplementary Note C6)

The control method according to any one of Supplementary Notes C1 to C3, wherein
the antenna to be assigned is controlled based on the radio quality information, and
when the antenna is controlled, the predicted prediction information is added to a candidate antenna that is a candidate for the antenna to be assigned based on the radio quality information.

(Supplementary Note C7)

The control method according to any one of Supplementary Notes C1 to C6, wherein the assignment information and the prediction information include information about a beam to be input or output with use of a plurality of antenna elements of the antenna.

(Supplementary Note C8)

The control method according to any one of Supplementary Notes C1 to C7, wherein the radio quality information includes at least one of signal power information of RSRP or RSSI of the antenna or channel estimation information of each frequency or each RB.

(Supplementary Note C9)

The control method according to any one of Supplementary Notes C1 to C8, wherein
the assignment information includes a first antenna assigned to the wireless communications based on the radio quality information and a second antenna that comes next to the first antenna, and
the prediction information includes a third antenna to be assigned the predetermined length of time after the in-operation time-series data and a fourth antenna that comes next to the third antenna.

(Supplementary Note C10)

The control method according to any one of Supplementary Notes C1 to C8, wherein
the assignment information is an assignment set that includes at least a first antenna assigned to the wireless communications based on the radio quality information and a second antenna that comes next to the first antenna, and
the prediction information is a prediction set that includes at least a third antenna to be assigned the predetermined length of time after the in-operation time-series data and a fourth antenna that comes next to the third antenna.

(Supplementary Note C11)

The control method according to Supplementary Note C7, wherein
the assignment information includes a first beam assigned to the wireless communications based on the radio quality information and a second beam that comes next to the first beam, and
the prediction information includes a third beam to be assigned the predetermined length of time after the in-operation time-series data and a fourth beam that comes next to the third beam.

(Supplementary Note C12)

The control method according to Supplementary Note C7, wherein
the assignment information is an assignment set that includes at least a first beam assigned to the wireless communications based on the radio quality information and a second beam that comes next to the first beam, and
the prediction information is a prediction set that includes at least a third beam to be assigned the predetermined length of time after the in-operation time-series data and a fourth beam that comes next to the third beam.

(Supplementary Note C13)

The control method according to any one of Supplementary Notes C1 to C12, wherein the learning device incorporates movement information of the terminal device calculated from the time-series data into the training data.

(Supplementary Note C14)

The control method according to any one of Supplementary Notes C1 to C13, wherein the radio quality information includes information to be input upon a value no greater than a certain threshold being replaced by zero or a lower limit.

(Supplementary Note D1)

A control program that causes a computer to execute:
predicting prediction information based on in-operation time-series data by use of a learning device, the learning device being trained, during training,
(i) with time-series data, using as training data, in which pieces of radio quality information of respective antennas that are disposed in a distributed manner and that perform wireless communications with a terminal device are arranged in time series, and
(ii) with assignment information, using as a training label, that includes information about the antenna assigned, from the training data, to the wireless communications after a predetermined length of time, wherein
the in-operation time-series data being the time-series data acquired during operation, and
the prediction information including information about the antenna to be assigned, from the in-operation time-series data, to the wireless communications after the predetermined length of time.

(Supplementary Note D2)

The control program according to Supplementary Note D1, wherein the control program causes a computer to execute:
during the training, performing the training with time-series data in which pieces of radio quality information of respective antennas that are disposed in a distributed manner and that perform wireless communications with a terminal device are arranged in time series used as training data and with assignment information that includes information about the antenna assigned to the wireless communications a predetermined length of time after the training data used as a training label, and when performing the training, selecting, as the training data, the time-series data classified in accordance with a result of a comparison of the assignment information used as the training label and the assignment information assigned to the wireless communications based on the radio quality information immediately preceding the training label in the time-series data.

(Supplementary Note D3)

The control program according to Supplementary Note D2, wherein the control program causes a computer to execute:

when selecting the training data, selecting, as the training data, the time-series data classified in accordance with a result of a comparison of pieces of assignment information assigned to the wireless communications based on respective pieces of radio quality information in the time-series data.

(Supplementary Note D4)

The control program according to Supplementary Note D2 or D3, wherein the control program causes a computer to execute:

determining an occurrence of reconnection during the operation, and when determining an occurrence of reconnection, classifying reconnection time-series data served by the time-series data in which the reconnection has occurred and reconnection assignment information that includes information about the antenna assigned to the wireless communications the predetermined length of time after the reconnection time-series data, and selecting the reconnection time-series data and the reconnection assignment information as the training data and the training label.

(Supplementary Note D5)

The control program according to Supplementary Note D2 or D3, wherein the control program causes a computer to execute:

when selecting the training data, selecting, as the training data, the time-series data classified in accordance with movement information of the terminal device calculated from the time-series data.

(Supplementary Note D6)

The control program according to any one of Supplementary Notes D1 to D3, wherein the control program causes a computer to execute:

controlling the antenna to be assigned based on the radio quality information, and when controlling the antenna, adding the predicted prediction information to a candidate antenna that is a candidate for the antenna to be assigned based on the radio quality information.

(Supplementary Note D7)

The control program according to any one of Supplementary Notes D1 to D6, wherein the assignment information and the prediction information include information about a beam to be input or output with use of a plurality of antenna elements of the antenna.

(Supplementary Note D8)

The control program according to any one of Supplementary Notes D1 to D7, wherein the radio quality information includes at least one of signal power information of RSRP or RSSI of the antenna or channel estimation information of each frequency or each RB.

(Supplementary Note D9)

The control program according to any one of Supplementary Notes D1 to D8, wherein the assignment information includes a first antenna assigned to the wireless communications based on the radio quality information and a second antenna that comes next to the first antenna, and the prediction information includes a third antenna to be assigned the predetermined length of time after the in-operation time-series data and a fourth antenna that comes next to the third antenna.

(Supplementary Note D10)

The control program according to any one of Supplementary Notes D1 to D8, wherein the assignment information is an assignment set that includes at least a first antenna assigned to the wireless communications based on the radio quality information and a second antenna that comes next to the first antenna, and the prediction information is a prediction set that includes at least a third antenna to be assigned the predetermined length of time after the in-operation time-series data and a fourth antenna that comes next to the third antenna.

(Supplementary Note D11)

The control program according to Supplementary Note D7, wherein the assignment information includes a first beam assigned to the wireless communications based on the radio quality information and a second beam that comes next to the first beam, and the prediction information includes a third beam to be assigned the predetermined length of time after the in-operation time-series data and a fourth beam that comes next to the third beam.

(Supplementary Note D12)

The control program according to Supplementary Note D7, wherein the assignment information is an assignment set that includes at least a first beam assigned to the wireless communications based on the radio quality information and a second beam that comes next to the first beam, and the prediction information is a prediction set that includes at least a third beam to be assigned the predetermined length of time after the in-operation time-series data and a fourth beam that comes next to the third beam.

(Supplementary Note D13)

The control program according to any one of Supplementary Notes D1 to D12, wherein the learning device incorporates movement information of the terminal device calculated from the time-series data into the training data.

(Supplementary Note D14)

The control program according to any one of Supplementary Notes D1 to D13, wherein the radio quality information includes information to be input upon a value no greater than a certain threshold being replaced by zero or a lower limit.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A control device configured to predict prediction information based on in-operation time-series data by use of a learning device, the learning device being trained, during training,
    (i) with time-series data, using as training data, in which pieces of radio quality information of respective antennas that are disposed in a distributed manner and that perform wireless communications with a terminal device are arranged in time series, and
    (ii) with assignment information, using as a training label, that includes information about an antenna assigned, from the training data, to the wireless communications after a predetermined length of time, wherein
    the in-operation time-series data being the time-series data acquired during operation, and
    the prediction information including information about the antenna to be assigned, from the in-operation time-series data, to the wireless communications after the predetermined length of time.

2. The control device according to claim 1, wherein the control device comprises:
    at least one memory storing instructions; and
    at least one processor configured to execute the instructions to cause the control device to select, as the training data during the training, the time-series data classified in accordance with a result of a comparison of the assignment information used as the training label with the assignment information assigned to the wireless communications based on the radio quality information immediately preceding the training label in the time-series data.

3. The control device according to claim 2, wherein the at least one processor is configured to execute the instructions to cause the control device to select, as the training data, the time-series data classified in accordance with a result of a comparison of pieces of assignment information assigned to the wireless communications based on respective pieces of radio quality information in the time-series data.

4. The control device according to claim 2, wherein the at least one processor is configured to execute the instructions to cause the control device to:
    determine an occurrence of reconnection during the operation;
    classify reconnection time-series data served by the time-series data in which the reconnection has occurred and reconnection assignment information that includes information about an antenna assigned to the wireless communications the predetermined length of time after the reconnection time-series data; and
    select the reconnection time-series data and the reconnection assignment information as the training data and the training label.

5. The control device according to claim 2, wherein the at least one processor is configured to execute the instructions to cause the control device to select, as the training data, the time-series data classified in accordance with movement information of the terminal device calculated from the time-series data.

6. The control device according to claim 1, wherein the control device comprises:
    at least one memory storing instructions; and
    at least one processor configured to execute the instructions to cause the control device to:
    control an antenna to be assigned to the wireless communications based on the radio quality information; and
    add the prediction information to a candidate antenna that is a candidate for the antenna to be assigned based on the radio quality information.

7. The control device according to claim 1, wherein the assignment information and the prediction information include information about a beam to be input or output by use of a plurality of antenna elements of the antenna.

8. The control device according to claim 1, wherein the radio quality information includes at least one of signal power information of RSRP or RSSI of the antenna or channel estimation information of each frequency or each RB.

9. The control device according to claim 1, wherein
    the assignment information includes a first antenna assigned to the wireless communications based on the radio quality information and a second antenna that is assigned to the wireless communications after the first antenna is assigned to the wireless communications, and
    the prediction information includes a third antenna to be assigned the predetermined length of time after the in-operation time-series data and a fourth antenna that comes next to the third antenna.

10. The control device according to claim 1, wherein
    the assignment information is an assignment set that includes at least a first antenna assigned to the wireless communications based on the radio quality information and a second antenna that comes next to the first antenna, and
    the prediction information is a prediction set that includes at least a third antenna to be assigned the predetermined length of time after the in-operation time-series data and a fourth antenna that comes next to the third antenna.

11. The control device according to claim 7, wherein
    the assignment information includes a first beam assigned to the wireless communications based on the radio quality information and a second beam that comes next to the first beam, and
    the prediction information includes a third beam to be assigned the predetermined length of time after the in-operation time-series data and a fourth beam that comes next to the third beam.

12. The control device according to claim 7, wherein
    the assignment information is an assignment set that includes at least a first beam assigned to the wireless communications based on the radio quality information and a second beam that comes next to the first beam, and
    the prediction information is a prediction set that includes at least a third beam to be assigned the predetermined length of time after the in-operation time-series data and a fourth beam that comes next to the third beam.

13. The control device according to claim 1, wherein the learning device incorporates movement information of the terminal device calculated from the time-series data into the training data.

14. The control device according to claim 1, wherein the radio quality information includes information to be input upon a value no greater than a certain threshold being replaced by zero or a lower limit.

15. A wireless communications system, comprising:
    a plurality of antennas disposed in a distributed manner and configured to perform wireless communications with a terminal device; and a control device configured to predict prediction information based on in-operation time-series data by use of a learning device, the learning device being trained, during training, (i) with time-series data, using as training data, in which pieces of radio quality information of the respective antennas are arranged in time series, and (ii) with assignment information, using as a training label, that includes information about an antenna assigned, from the training data, to the wireless communications after a predetermined length of time, wherein the in-operation time-series data being the time-series data acquired during operation, and the prediction information including information about the antenna to be assigned, from the in-operation time-series data, to the wireless communications after the predetermined length of time.

16. The wireless communications system according to claim 15, wherein the control device is provided in a wireless base station apparatus.

17. The wireless communications system according to claim 15, further comprising a RIC configured to control one or more wireless base station apparatuses, wherein the control device is
provided in the RIC,
configured to acquire the radio quality information from at least one of the wireless base station apparatuses, and
configured to output the prediction information to at least one of the wireless base station apparatuses.

18. A non-transitory computer-readable medium storing a control program that causes a computer to execute:

predicting prediction information based on in-operation time-series data by use of a learning device, the learning device being trained, during training, (i) with time-series data, using as training data, in which pieces of radio quality information of respective antennas that are disposed in a distributed manner and that perform wireless communications with a terminal device are arranged in time series, and (ii) with assignment information, using as a training label, that includes information about an antenna assigned, from the training data, to the wireless communications after a predetermined length of time, wherein the in-operation time-series data being the time-series data acquired during operation, and the prediction information including information about the antenna to be assigned, from the in-operation time-series data, to the wireless communications after the predetermined length of time.

* * * * *